(12) United States Patent
Reitemann et al.

(10) Patent No.: US 12,529,388 B2
(45) Date of Patent: Jan. 20, 2026

(54) MOBILE MACHINE AND METHOD

(71) Applicant: AGCO International GmbH, Neuhausen (CH)

(72) Inventors: Gabriel Reitemann, Marktoberdorf (DE); Benjamin Frommelt, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 0 days.

(21) Appl. No.: 18/707,967

(22) PCT Filed: Nov. 15, 2022

(86) PCT No.: PCT/IB2022/060969
§ 371 (c)(1),
(2) Date: May 7, 2024

(87) PCT Pub. No.: WO2023/100002
PCT Pub. Date: Jun. 8, 2023

(65) Prior Publication Data
US 2025/0020145 A1    Jan. 16, 2025

(30) Foreign Application Priority Data

Dec. 3, 2021 (GB) ...................................... 2117529

(51) Int. Cl.
*F15B 1/26*    (2006.01)
*F15B 19/00*   (2006.01)

(52) U.S. Cl.
CPC ................ *F15B 1/26* (2013.01); *F15B 19/00* (2013.01)

(58) Field of Classification Search
CPC .......... F15B 1/26; F15B 11/165; F04B 49/08; F04B 49/002; F04B 49/02; F04B 49/12; E02F 9/2235
See application file for complete search history.

(56) References Cited

U.S. PATENT DOCUMENTS 5,129,230 A    7/1992 Izumi et al.
5,193,342 A    3/1993 Omberg et al.
(Continued)

FOREIGN PATENT DOCUMENTS

DE    102009020111 A1    11/2010
DE    102014103932 B3    7/2015
(Continued)

OTHER PUBLICATIONS

UK Intellectual Property Office, Search Report for related UK Application No. GB2117529.4, dated May 24, 2022, 3 pages.
(Continued)

*Primary Examiner* — Nathaniel E Wiehe
*Assistant Examiner* — Daniel S Collins

(57) ABSTRACT

A mobile machine such as a tractor has an engine and hydraulic supply system including a pump supply with a pump (MP) driven by the engine to provide a pressurized fluid at a pump supply pressure PSP. The hydraulic supply system has an electronic load sensing system (E-LS) to regulate the pump supply pressure. The E-LS is arranged to increase a stand-by pressure differential of the pump supply once the engine is determined to be running following start-up. This enables the hydraulic supply system to be configured with a reduced hydro-mechanically defined stand-by pressure differential so that it places a reduced load on the engine when it is started. The E-LS may be arranged to inhibit LS control of the pump supply when the engine is started, with LS functionality only commenced once the engine is running. Reduced load on the engine during start-up can improve cold starting.

18 Claims, 4 Drawing Sheets

(56) References Cited

U.S. PATENT DOCUMENTS

| | | | |
|---|---|---|---|
| 5,479,778 | A | 1/1996 | Toyooka et al. |
| 6,308,516 | B1 | 10/2001 | Kamada |
| 6,651,428 | B2 | 11/2003 | Takahashi et al. |
| 8,596,052 | B2 | 12/2013 | Vigholm et al. |
| 9,200,431 | B2 | 12/2015 | Mori et al. |
| 9,861,024 | B2 | 1/2018 | Vogler et al. |
| 10,329,739 | B2 | 6/2019 | Hoshino et al. |
| 10,575,454 | B2 | 3/2020 | De Nale et al. |
| 11,214,940 | B2 | 1/2022 | Takahashi et al. |
| 2007/0151238 | A1 | 7/2007 | Kraft |
| 2009/0031719 | A1 | 2/2009 | Tsuruga et al. |
| 2010/0154400 | A1 | 6/2010 | Krajnik et al. |
| 2010/0154401 | A1 | 6/2010 | Sullivan, Jr. et al. |
| 2013/0345694 | A1* | 12/2013 | Swanson .................. A61N 1/06 606/33 |
| 2014/0165543 | A1 | 6/2014 | Takebayashi et al. |
| 2017/0325393 | A1 | 11/2017 | Gschwendtner et al. |
| 2019/0345694 | A1 | 11/2019 | Schmuttermair et al. |
| 2021/0025133 | A1 | 1/2021 | Myers et al. |
| 2021/0025138 | A1 | 1/2021 | Muehlbauer et al. |
| 2022/0030756 | A1 | 2/2022 | Vennemann |

FOREIGN PATENT DOCUMENTS

| | | |
|---|---|---|
| DE | 102016107187 A1 | 10/2017 |
| EP | 0796952 A1 | 9/1997 |
| EP | 1266563 A1 | 12/2002 |
| EP | 2878829 A1 | 6/2015 |
| EP | 2886926 A1 | 6/2015 |
| JP | H0874805 A | 3/1996 |
| JP | 2001074001 A | 3/2001 |
| JP | 2008151211 A | 7/2008 |
| JP | 2008180203 A | 8/2008 |
| JP | 2009074406 A | 4/2009 |
| JP | 2009299301 A | 12/2009 |

OTHER PUBLICATIONS

European Patent Office, International Search Report related to International Patent Application No. PCT/IB2022/060969, mail date Jan. 25, 2023, 22 pages.

Dipl.-Ing. Rudiger Freimann, Springe: ""Kapitel 1-4" "Automation mobiler Arbeitsmaschinen—Gerat steuert Traktor"", Dec. 1, 2003 (Dec. 1, 2003), VDI-VERLAG, Dusseldorf, XP055628781, pp. 1-150. Including translation of pp. 15, 68-70, 92. Including translation of pictures: 33, 35, 39. Including translation of tables: 11, 12.

* cited by examiner

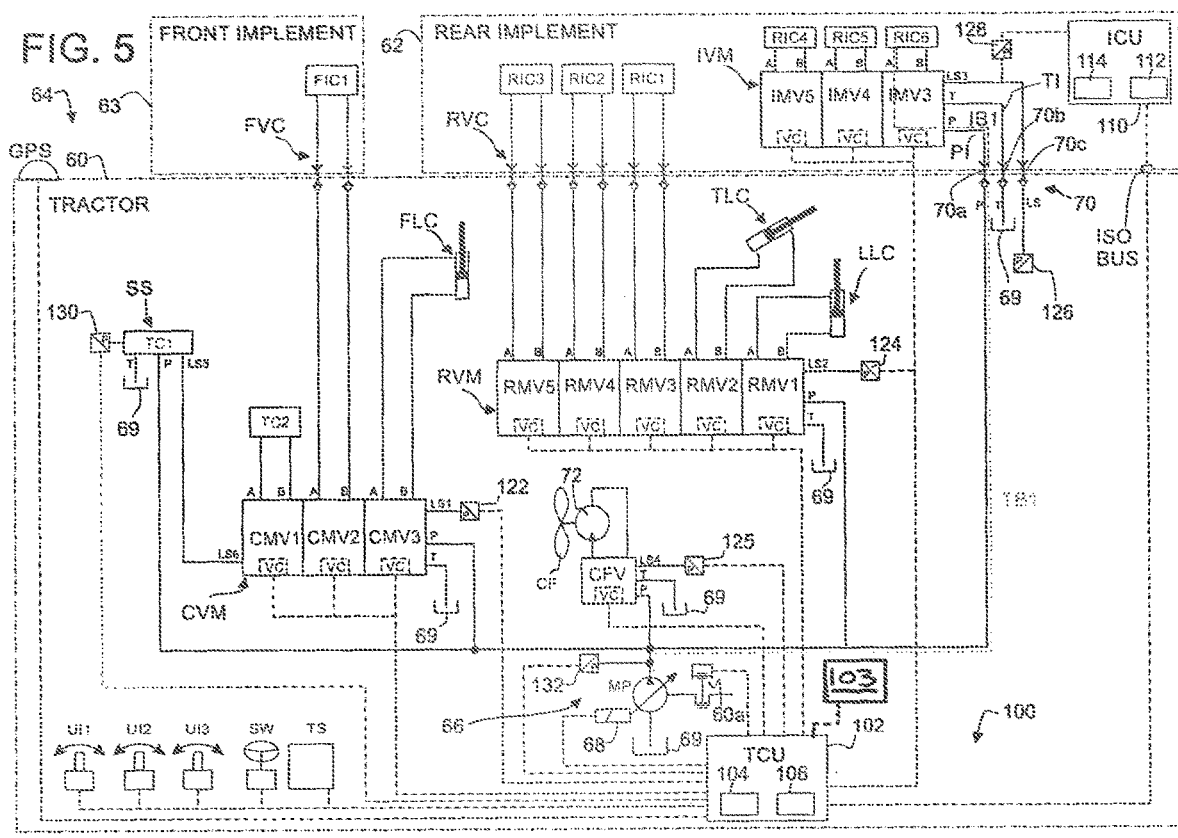

MOBILE MACHINE AND METHOD

CROSS-REFERENCE TO RELATED APPLICATIONS

This application is a national phase entry under 35 U.S.C. § 371 of International Patent Application PCT/IB2022/060969, filed Nov. 15, 2022, designating the United States of America and published in English as International Patent Publication WO 2023/100002 A1 on Jun. 8, 2023, which claims the benefit of the filing date of U.K. Patent Application 2117529.4 "Mobile Machine and Method," filed Dec. 3, 2021, the entire disclosure of which is incorporated herein by reference.

FIELD

The disclosure relates to a mobile machine having an engine and a pressurized fluid supply system and to a method of operating such a mobile machine. The disclosure relates in particular to an agricultural mobile machine such as a tractor.

BACKGROUND

Pressurized fluid (hydraulic) supply systems are widely used to drive consumers on agricultural or construction mobile machines, e.g. a tractor or a self-propelled harvester, or on implements attached thereto. Such mobile machines will be referred to hereinafter simply as machines and are sometimes referred to as vehicles. These hydraulic systems are mostly provided with a pump supply, consumers, control means (respectively control valves) and a tank to provide a fluid reservoir. The term "consumer" is used in the further description to encompass hydraulic drives such as rotary motors or linear rams but also for the respective control valves assigned to these drives. The term "control" in relation to supply systems hereby includes any adjustment of the supply system regarding direction, supply time or pressure of the fluid flow. The term "pump supply" includes the pump and all valve means which are needed to adjust the fluid flow and/or fluid pressure supplied by the pump to a pump supply line. The pressure of the fluid provided by the pump supply being referred to herein as the pump supply pressure PSP.

In a hydrostatic hydraulic system, a pressure differential is needed to provide hydrostatic work (an output). This pressure differential between the pump supply (source) and consumer results in a fluid flow which is sufficient to undertake work, such as to lift a tractor three-point hitch or a operate a rotary drive on an implement or in a hydrostatic drive for example. Furthermore, a stand-by or static pressure differential $\Delta P_{st}$ is also needed when the system is otherwise in idle mode to keep control valves (assigned to consumers) responsive so that the spool of the valve can be moved on demand.

Starting an internal combustion engine of a mobile machine can be problematic. The process of staring an internal combustion engine will be referred to herein as "engine start-up". This term describes a process in which the engine is brought from zero speed (rpm) to a minimum operative speed at which the engine operates under its own power using the internal combustion process. Engine star up is usually effected using an electric engine starter which turns the engine over until the internal combustion process is established and the engine can run independently of the starter.

Engine start-up is especially difficult in cold weather, when e.g. the oil of the internal lubrication system is cold and puts additional resistance to the engine start-up, a further aspect must be seen. However, engine start-up is also impacted by secondary drives (e.g. alternators for loading the internal battery, air compressors for the brake system, HVAC compressors for the passenger cab, and hydraulic pumps forming part of a hydraulic supply system) which are directly driven by the engine crankshaft or belt drives drivingly connected thereto. These place a significant external load on the engine during start-up. The number and size of secondary drives has increased overtime to meet increasing demands for driver comfort, vehicle performance and to enable additional functions giving rise to increased issues during engine start-up.

To meet the increased loads being placed on the engine during start-up, more powerful engine starters have been adopted. These require higher battery capacity and size which negatively impacts costs and installation space. A further approach is to reduce the external load placed on the engine by providing clutches for disconnecting secondary drives during engine start-up. This approach is suitable for secondary drives which are not run permanently, such as air compressors and HVAC compressors, as these are widely available with integrated clutches. However, hydraulic pumps are not generally available with integrated clutches and therefore would require additional clutch arrangements to disconnect for the engine during start-up. Furthermore, it is not usually possible to disengage a hydraulic pump on a mobile machine before starting the engine as the pump supplies systems that are essential.

Variable displacement pumps used in pressurized fluid (hydraulic) supply systems of tractors and other mobile machines require an internal pump pressure differential to enable pump adjustment. Accordingly, even if the pump is in idle mode in which it does not supply hydraulic fluid to a hydraulic consumer, an internal pressure in the form of a stand-by pressure differential $\Delta_{pst}$ is generated to enable the pump to be adjusted.

Accordingly, during engine start-up, the hydraulic pump places a load on the engine in order to meet at least the stand-by pressure differential $\Delta p_{st}$. This may be detrimental to the process of starting the engine. As hydraulic supply systems become more complex, with multiple pumps and consumers, this problem is exacerbated.

Hydraulic losses are present whenever oil circulates within a hydraulic system even when no consumer is operated. To mitigate this problem, it is known to provide means to forward a demand of a consumer to the pump supply. These systems are generally called load sensing systems (the term load sensing is abbreviated to LS). In such systems, a load induced pressure demand of the consumers, hereafter referred to as a "load sensing pressure" LSP, is hydraulically fed back to the pump supply via pipes or hoses so that pump supply oil flow/pressure can be adjusted according to the needs of the consumers. This load sensing pressure LSP feedback signal is typically generated by the control valve assigned to a consumer and the highest load sensing pressure LSP of all the consumers supplied by the pump is used to adjust the pump supply.

In general, there are two different types of hydraulic supply systems with LS demand feedback available on the market-closed-center load sensing systems (CC-LS systems) and open-center load sensing systems (OC-LS systems).

CC-LS systems are equipped with variable displacement pumps whereby the demand of the consumers is hydraulically fed back to the pump supply including an adjustment means for the pump so that the displacement of the pump is adjusted according to the needs of the consumers.

To ensure that a stand-by pressure differential $\Delta P_{st}$ is maintained in the supply to support fast system response, the pump is kept on low displacement to compensate for losses/leakage resulting in a stand-by pressure even if there is no demand by consumers. As a result of the reduction of the hydraulic fluid circulation, losses and power input required by the pump are reduced.

FIG. 1 illustrates part of a simplified known CC-LS hydraulic circuit. A pump supply 10 includes a variable displacement pump 12 which draws fluid from a tank 14 and forwards pressurized fluid to consumers (not shown) via a pump supply line P. Fluid is returned to the tank from the consumers via a return or tank line T. The pump 12 can be any suitable variable displacement pump and could, for example, be a swash plate axial piston pump in which the displacement of the pump is changed by pivoting the swash plate by means of a pump actuator 16 to vary the piston stoke. In the arrangement illustrated, actuator 16 is biased by a spring to pivot the swash plate in a direction to increase pump displacement and hence the output of the pump. Pressurized fluid introduced into a chamber 20 of the actuator opposes the force of the spring and if the force of the fluid is greater than that of the spring the swash plate is pivoted to reduce the delivery of the pump.

Operation of the actuator 16 is controlled by a flow control valve 22 and a pressure limiting valve 24, which together with the actuator 16 form a pump controller and form part of the pump supply 10. Each of the valves is biased by a respective spring 26, 28 to the position shown in which the actuator chamber 20 is connected to the tank 14. Each of the valves has a pump pressure port 30, 32 connected to the pressure line P of pump so that the fluid pressure acting on the valve spool through the pump pressure port 30, 32 opposes the force of the respective spring 26, 28. The flow control valve 22 also has a LS pressure port 34 to which a load sensing pressure signal line LS is connected. The highest consumer load sensing pressure LSP of the various consumers in the hydraulic LS system is fed into the LS pressure signal line so that the load sensing pressure LSP is added to the force of the spring to move the valve spool towards the position shown. The spring 26 in the flow control valve sets the stand-by pressure differential $\Delta P_{st}$ which is typically in the region of 10 to 30 bar for tractor applications. The spring force may be adjustable to enable the stand-by pressure differential $\Delta P_{st}$ to be adjusted. The spring 28 of the pressure limiting valve sets the maximum operating pressure of the system, which could be in the region 250 bar in the present example. Again, the spring force may be adjustable to enable the maximum operating pressure to be adjusted.

In normal operation when the system is at idle with no demand from the consumers, the pump supply pressure PSP acting through the pump pressure port 30 of the flow control valve 22 moves the spool against the force of the spring 26 to introduce pressurized fluid in to the chamber 20 of the actuator. This causes the actuator to pivot the swash plate and reduce the output of the pump until the pump supply pressure PSP balances the force of the spring 26 so that the output of the pump is held at the stand-by pressure $\Delta P_{st}$.

When a load sensing pressure signal LSP (or an increasing load sensing pressure signal) is reported to the LS pressure port 34 via the LS sensing line, this is added to the force of the spring 26 moving the valve spool so that the fluid pressure in the chamber 20 of the actuator is reduced. In response, the actuator 16 moves the swash plate to increase the output of the pump until the pump supply pressure PSP balances the force of the spring 26 and the load sensing pressure signal LSP. The pump therefore delivers a pump supply pressure PSP that is higher than the load sensing pressure LSP by the stand-by pressure differential $\Delta P_{st}$.

The pressure limiting valve 24 is usually held in the position shown by the spring 28 so that fluid passes into and out of the actuator chamber 20 under the control of the flow control valve 22. However, should the pump supply pressure PSP exceed the maximum permitted system pressure, as defined by the spring 28, the spool of the pressure limiting valve 24 is moved against the spring force to admit pressurized fluid into the chamber 20 of the actuator. This reduces the output of the pump until the pump supply pressure PSP it is brought back below the maximum permitted system pressure.

Generally, CC-LS systems are more expensive and complex than OC-LS systems but they have the advantage that the pump is only delivering above the stand-by pressure $\Delta P_{st}$ on demand. This has a positive effect on the overall system efficiency. These systems are mainly used in high performance and high specification tractors (e.g. >100 kW) used to supply complex and powerful implements.

In contrast to CC-LS systems, OC-LS systems are provided with a fixed displacement pump. FIG. 2 illustrates part of a simplified OC-LS hydraulic circuit. A constant displacement pump 12' draws hydraulic fluid from a tank 14 and delivers it to various consumers (not shown) via a pump supply or pressure line P. Fluid is returned to the tank 14 from the consumers via a return or tank line T. A proportional pressure compensator valve 40 forms part of the pump supply and is operative to selectively connect the pump supply line P to the tank 14. The spool of the valve 40 is biased by a spring 44 towards a closed position, as shown, in which pump supply line P is not connected to the tank. This spring 44 sets a static or stand-by pressure differential $\Delta P_{st}$ and the spring force may be adjustable to enable the stand-by pressure differential $\Delta P_{st}$ to be adjusted. The pump supply pressure PSP is applied to the opposite end of the spool via a pressure port 46 to oppose the force of the spring. The valve also has an LS pressure port 48 through which a consumer load sensing pressure signal LSP is applied to the valve spool to act in addition to the spring force.

In an idle mode in which there is no consumer demand, the pump supply pressure PSP opposes the spring force to open the valve and connect the pump supply line P to the tank. The pump supply pressure PSP in the pump supply line falls until it balances the spring force and is then held at the stand-by pressure differential $\Delta P_{st}$. If a consumer load sensing pressure signal LSP is forwarded to the valve 40 via the LS pressure port 48, this adds to the spring force tending to close the valve so that the pump supply pressure PSP increases until it balances the combination of the spring force and the load sensing pressure LSP. The pump supply pressure PSP is thereby held a level which is higher than the load sensing pressure LSP by the stand-by pressure differential $\Delta P_{st}$ defined by the spring 44.

A further trend can be seen related to the supply and control means used on implements attached to an agricultural machine, such as a tractor. Due to increasing automation in agricultural work, implements are provided with more and more control functions which require complex control strategies. While in the past implements were equipped with only a few controllable drives (e.g. hydraulic cylinders or motors) which were controlled by valves on the tractor, today implements are provided with numerous controllable drives which cannot be controlled by the valves installed on the tractor. To address this, tractors are often equipped with power beyond systems (which may also be referred to in the art as high-pressure carry over). As the name suggests, these systems supply an uncontrolled (at the tractor) fluid flow from the pump supply to the implement via a respective interface, such as quick couplers. The implement itself is then equipped with control means in form of valves to adjust the parameters of the fluid supply. Similar to internal consumers on the tractor, these power beyond systems also include a LS function so that the load sensing pressure of consumers on the implement can be fed back to the pump supply on the tractor via a hydraulic LS line.

A typical power beyond interface 50 is illustrated in FIG. 1 and includes quick release hydraulic couplings 50a, 50b, 50c for releasably connecting a pump supply line P, a return or tank line T, and an LS signal line on the tractor to equivalent hydraulic lines Pi, Ti, LSi on the implement. As illustrated, the LS line ($LS_{pb}$) from the power beyond interface which reports a LS signal from the consumers on the implement and an LS line ($LS_t$) which reports a LS signal from the consumers on the tractor are connected to the LS pressure port 34 on the flow control valve 22 though a shuttle valve 52 or another functionally similar arrangement. This ensures that the highest LS load sensing pressure signal from the implement or the tractor is used to control the output of the pump. If there are a number of consumers on the implement, shuttle valves or other functionally similar arrangements are used to ensure the highest LS load sensing pressure signal LSP of the implement consumers is fed through to the power beyond LS connection 50c. Similarly, if there are a number of consumers on the tractor, shuttle valves are used to feed the highest LS load sensing pressure signal LSP of the tractor consumers to the $LS_t$ line and hence to the shuttle valve 52.

A major advantage of the power beyond system is that the costs involved with fluid supply control are moved from the tractor to the implement so that a wider range of applications can be handled by tractors with reduced hydraulic control capability. These power beyond systems have mainly been the reserve of tractors with higher performance (>100 kW) and CC-LS systems. However, a demand has been recognized for smaller tractors with OC-LS systems to provide power beyond, for example vineyard tractors with about 70 kW have to provide a supply to complex implements such as fruit harvesters equipped with many hydraulic drives to be controlled.

A drawback with purely hydraulic LS arrangements is that the hydraulic load sensing pressure signal LSP has to be forwarded to the pump supply by hydraulic lines. If the load sensing pressure signal LSP comes from a consumer on an implement, a coupling is required to releasably connect the implement hydraulic LS signal line with a hydraulic LS signal line on the tractor. Furthermore, the various hydraulic LS signal lines from different consumers must be connected via shuttle valves to ensure that the highest consumer load sensing pressure LSP is forwarded to the pump supply. This all involves considerable additional expense and takes up valuable installation space. To overcome these drawbacks, electrohydraulic load sensing (E-LS) arrangements have been developed.

U.S. Patent Application Publication 2007/0151238 A1, "Hydrostatic Drive System," published Jul. 5, 2007, discloses a hydrostatic drive system in which a variable displacement pump controller is actuated electronically by an electronic control device. A pressure sensor is used to detect a hydraulic consumer load sensing pressure LSP and provides an input to the electronic control system. The electronic control system generates an electronic control signal for actuating the displacement pump controller via a LS control valve to set the pump supply pressure PSP so that it is higher than the sensed load sensing pressure LSP by a set amount $\Delta P_{st}$. The system avoids the need for lengthy hydraulic LS load sensing pressure signal lines.

German Patent 102014103932 B3, "Control Device for a Hydraulic Working Machine, Hydraulic System and Method for Controlling a Hydraulic System," granted Jul. 23, 2015, discloses an E-LS system for an implement towed by a tractor. The towed implement has an electronic control device which determines the difference between the pump supply pressure PSP and the highest load sensing pressure LSP of the consumers on the towed implement. An electronic signal indicative of the pressure difference is forwarded to a hydraulic control module coupled to a LS connection of a variable displacement pump on the tractor. The hydraulic control module converts the electronic signal to a hydraulic control signal for controlling the pump displacement.

U.S. Patent Application Publication 2019/0345694 A1, "Hydraulic Control Arrangement for an Arrangement of Mobile Machines, and Arrangement of Mobile Machines," published Nov. 14, 2019, discloses a further E-LS system for a tractor and towed implement which does not necessarily require an electronic controller on the implement. In the arrangement disclosed, a pressure sensor is provided on the tractor to detect a hydraulic LS load sensing pressure signal LSP provided by the implement via a power beyond LS coupling. The pressure sensor forwards an electronic load sensing pressure signal ELSPS representative of the hydraulic load sensing pressure LSP to an electronic control unit on the tractor which controls a transducer (e.g. a solenoid actuated pressure limiting valve) to provide a hydraulic pump supply control signal HPSCS having a pressure $P_{set}$ for forwarding to a variable displacement pump controller. A further pressure sensor may be provided to forward an electronic load sensing pressure signal ELSPS representative of the highest load sensing pressure LSP of a number of consumers on the tractor. In this case, the electronic control unit selects the highest of the electronic load sensing pressure signals to use as a basis to control the transducer. The hydraulic pump supply control signal HPSCS output from the transducer may be connected with the pump controller via a shuttle valve, with a hydraulic load sensing pressure signal LSP from a steering system providing a further input to the shuttle valve. In this case, the highest pressure of the hydraulic pump supply control signal HPSCS from the transducer or the load sensing pressure LSP from the steering system is forwarded to the pump controller. This illustrates how E-LS and traditional hydraulic LS can be combined.

Arrangements for adjusting the pump supply pressure PSP in an E-LS system can be similar to those illustrated in either of FIGS. 1 and 2, except that a hydraulic pump supply control signal HPSCS for application to the LS pressure port 34, 48 of a flow control valve 22 or pressure compensator valve 40 is produced using a suitable transducer in dependence on an electronic pump supply control signal EPSCS from the controller. The transducer may be a solenoid-controlled pressure limiting valve, for example. The solenoid valve is actuated by the controller as a function of the hydraulic load sensing pressure demand LSP detected by a pressure sensor.

FIG. 3 illustrates how a pump supply 10 including a variable displacement pump 12 similar to that described above in relation to FIG. 1 can be adapted to incorporate a solenoid-controlled pressure limiting valve for use with an E-LS system. The pump supply 10 includes a flow control valve 22' to control the flow of fluid between the pump supply line P, the chamber 20 of the pump control actuator 16 and the tank 14. As in the hydraulic LS system of FIG. 1, a spring 26 sets the stand-by or static pressure differential and is opposed by the pressure in the pump supply line P connected to the pressure port 30 of the flow control valve 22'. However, for use in an E-LS system, the fluid pressure $P_{set}$ supplied to the LS pressure port 34 is set by a solenoid-controlled pressure limiting valve 54. When no current is provided to the solenoid 56 of the pressure limiting valve 54, the LS pressure port 34 is fully connected to the tank 14 and the pump supply pressure PSP at port 30 is opposed only by the force of the spring 26 in the flow control valve 22' so that the pump output is maintained at the stand-by pressure $\Delta P_{st}$. When a consumer load sensing pressure LSP is detected by a pressure sensor and forwarded to a controller, the controller generates an electronic pump supply control signal EPSCS which is forward to the solenoid of the pressure limiting valve 54. The electronic pump supply control signal EPSCS actuates the pressure limiting valve 54 so that a hydraulic pump supply control signal HPSCS at a pressure $P_{set}$ is applied at the LS port 34 of the flow control valve 22' in addition to the spring force. This causes the pump displacement to be increased until the pump supply pressure PSP balances the combination of the spring force and the pressure $P_{set}$ of the hydraulic supply control signal HPSCS.

As illustrated in U.S. Patent Application Publication 2019/0345694 A1, the hydraulic pump supply control signal HPSCS generated by the pressure limiting valve 54 may be forwarded to the LS port 34 via a shuttle valve with a conventionally generated hydraulic load sensing pressure signal LSP provided as second input to the shuttle valve. This arrangement enables an E-LS system to be integrated with a conventional hydraulic LS system.

For use with a fixed displacement pump arrangement such as that illustrated in FIG. 2, a solenoid actuated pressure limiting valve 54 can be used to generate a hydraulic pump supply control signal HPSCS for application to the LS pressure port 48 of the pressure compensator valve 40.

Other electronically controlled transducer arrangements can be used to convert an electronic pump supply control signal EPSCS into a hydraulic pump supply control signal HPSCS.

Though the known E-LS systems and methods work well and alleviate some of the problems of a purely hydraulic LS system, they have their own drawbacks. One issue the applicant has found is that E-LS increases the overall reaction time to adjust the pump supply pressure PSP in response to an increase in consumer load sensing pressure LSP. This can be explained by the fact that in a hydraulic LS system, the load sensing pressure signal LSP is forward by a generally static fluid column in the LS lines which immediately forwards a load sensing pressure demand. In electrohydraulic E-LS systems, the pressure sensors must communicate with the controller and the controller must communicate with the solenoid pressure limiting valve or other actuator for adjusting the pump supply pressure. This communication typically takes place over CAN or ETHERNET-BUS Networks. As a consequence, the electronic LS signal transfer depends on cycle times and these depend on the performance levels of the components. With the numerous electronic control systems used in agricultural machines today, the overall response time may be considerably higher compared to purely hydraulic LS systems.

E-LS systems may also increase problems associated with starting of an engine. In certain circumstances, E-LS systems may produce an unintended (erroneous) load demand signal LPS which causes the pump output to be unnecessarily increased as the engine is being started. For example, due to the very small size of the internal load sensing ducts used in valve manifolds, even a relatively small amount of heat can cause the pressure of fluid in the ducts to increase and can result in a pressure build of up to say 100 bar. This could potentially happen if a tractor engine is shut down and the tractor left in the sun for example. When the tractor is started in this condition, the E-LS detects this pressure and interprets it as a consumer load pressure demand LSP and so forwards a control signal to the pump output controller to increase the pump output or pump supply pressure PSP. The pump will therefore place a higher demand in terms of input power delivered by the engine which may negatively impact the ability of the engine to start.

There is a need for a mobile machine having a pressurized fluid supply system which overcomes, or at least mitigates the drawbacks of the known machines.

In particular, there is a need for a mobile machine having a pressurized fluid supply system which can be configured to place a reduced load on an engine of the mobile machine when the engine is being started than an equivalent conventional hydraulic supply system.

There is also a need for an alternative method of controlling a hydraulic supply system on a mobile machine which overcomes, or at least mitigates, some or all of the drawbacks of the known methods.

BRIEF SUMMARY

Aspects of the disclosure relate to a mobile machine and to a method of controlling a hydraulic supply system on a mobile machine In some embodiments, there is provided a mobile machine having an engine and a hydraulic supply system. The hydraulic supply system comprises a pump supply including a pump driven by the engine for supplying a pressurized fluid to at least one consumer on the mobile machine and/or an implement attached to the mobile machine. The pump supply is configured to provide a hydro-mechanically defined stand-by pressure differential M-$\Delta P_{st}$, the mobile machine comprising a control system for the hydraulic system. The control system comprises one or more controllers configured to receive, from a pressure sensor of a load sensing LS system associated with the at least one consumer, a pressure signal indicative of a sensed load sensing pressure LSP associated with the at least one consumer; and to generate a pump supply control signal for adjusting the pump supply pressure in dependence the load sensing pressure LSP. The control system is configured to make a determination that the engine is running in dependence on at least one condition indicative that the engine is running being met and to generate a pump supply control signal for adjusting the pump supply pressure to increase the stand-by pressure differential in dependence on a determination that the engine is running.

Advantageously, the hydro-mechanically defined stand-by pressure differential can be set to a lower value than the hydraulic system would normally require for correct operation to reduce the load on the engine during start-up. Using the E-LS system to increase the stand-by pressure differential once the engine has started enables the hydraulic supply system to function correctly with no detrimental effect.

The one or more controllers may collectively comprise an input (e.g. an electronic input) for receiving one or more input signals (e.g. the pressure signal) indicative of a sensed load sensing pressure LSP. The one or more controllers may collectively comprise one or more processors (e.g. electronic processors) operable to execute computer readable instructions for controlling operation of the control system, for example to determine when the engine is running based on data relating to one or more engine parameters such as RPM. The one or more processors may be operable to generate one or more control signals for controlling the pump supply pressure PSP. The one or more controllers may collectively comprise an output (e.g. an electronic output) for outputting the one or more control signals such as a pump supply control signal.

In an embodiment, the one or more controllers is/are configured to determine that the engine is running in dependence on the engine RPM exceeding a set speed for a set period of time. In one exemplary embodiment, the one or more controllers is/are configured to determine that the engine is running when the engine RPM exceeds 400 RPM for more than 4 seconds.

In an embodiment, the pump supply includes a variable displacement pump having a pump controller including a flow control valve for regulating movement of an actuator to adjust the pump displacement, a spring being operative on a valve spool of the flow control valve to set the hydro-mechanically defined stand-by pressure differential M-$\Delta P_{st}$. In this embodiment, the one or more controllers may be configured to generate an electronic pump supply control signal, the control system comprising a transducer for converting the electronic pump supply control signal to a hydraulic pump supply control signal HPSCS having a pressure $P_{set}$ for forwarding to an LS pressure port of the flow control valve. The control system may include a shuttle valve configured to forward the highest of a hydraulic pump supply control signal HPSCS and a hydraulic load sensing signal associated with a consumer to the LS port of the flow control valve. The transducer may be a solenoid controlled pressure limiting valve.

In an alternative embodiment, the pump supply includes a fixed displacement pump, the pump supply comprising a pressure compensator valve for selectively connecting a pump supply line to a reservoir (tank) to vary the pump supply pressure PSP, a spring being operative on a valve spool of the pressure compensator valve to set the hydro-mechanically defined stand-by pressure differential M-$\Delta P_{st}$. In this embodiment, the one or more controllers may be configured to generate an electronic pump supply control signal, the control system comprising a transducer for converting the electronic pump supply control signal to a hydraulic pump supply control signal HPSCS having a pressure $P_{set}$ for forwarding to an LS pressure port of the pressure compensator valve. The control system may include a shuttle valve configured to forward the highest of a hydraulic pump supply control signal HPSCS and a hydraulic load sensing signal associated with a consumer to the pressure compensator valve. The transducer may be a solenoid controlled pressure limiting valve.

If the hydraulic system is configured to operate at a system stand-by pressure differential S$\Delta P_{st}$, the hydro-mechanically defined stand-by pressure differential M-$\Delta P_{st}$ may be set to a lower value than the system stand-by pressure differential S$\Delta P_{st}$. In this case, the control system may be configured to raise the stand-by pressure differential to at least the system stand-by pressure differential S$\Delta P_{st}$ in dependence on a determination that the engine is running.

In an embodiment the one or more controllers is/are configured to generate a pump supply control signal for increasing the pump supply pressure above the hydro-mechanically defined stand-by pressure differential M-$\Delta P_{st}$ by at least a predefined amount (an electronic stand-by pressure differential E-$\Delta P_{st}$) in dependence on a determination that the engine is running irrespective of any load sensing pressure LSP reported by the at least one consumer.

The mobile machine can be configured so that once the engine has started and is running, the hydraulic supply system provides a minimum pump supply pressure that defines a stand-by pressure differential which is equal to the hydro-mechanically defined stand-by pressure differential M-$\Delta P_{st}$ plus an additional electronic stand-by pressure differential E-$\Delta P_{st}$.

In an embodiment, the one or more controllers is/are configured to inhibit LS functionality for controlling the output of the pump supply in dependence on a load sensing pressure LSP of the at least one consumer unless a determination that the engine is running has been made.

Because no electronic load sensing functionality is provided while the engine is being started, this eliminates the risk of the load sensing system demanding an increase in the pump supply pressure in response to a sensed load sensing pressure LSP, which may be erroneous.

In an embodiment, the one or more controllers is/are configured to determine that the engine is running and commence LS functionality in dependence the engine RPM exceeding a set speed for a set period of time. In one exemplary embodiment, the one or more controllers is/are configured to determine that the engine has started when the engine RPM exceeds 400 RPM for more than 4 seconds. The one or more controllers may be configured to commence LS functionality at the same time as the increased stand-by pressure differential is applied and in response to the same condition indicative that the engine is running the engine being met.

The mobile machine may be an agricultural mobile machine and may be a tractor.

In some embodiments, there is provided a method of controlling a hydraulic supply system on a mobile machine having an engine, wherein the hydraulic supply system comprises a pump supply including a pump driven by the engine for supplying a pressurized fluid to at least one consumer on the mobile machine and/or an implement attached to the mobile machine, the pump supply being configured to provide a hydro-mechanically defined stand-by pressure differential M-$\Delta P_{st}$, the mobile machine comprising a control system for the hydraulic system, the control system comprising one or more controllers configured to: receive, from a pressure sensor of a load sensing LS system associated with the at least one consumer, a pressure signal indicative of a sensed load sensing pressure LSP associated with the at least one consumer; and to generate a pump supply control signal for adjusting the pump supply pressure in dependence the load sensing pressure;

wherein, the method comprises using the one or more controllers to determine that the engine is running in dependence on at least one condition indicative that the engine is running being met and to adjust the pump supply to increase the stand-by pressure differential in dependence on a determination that the engine is running.

In an embodiment, the method comprises determining that the engine is running when the engine RPM exceeds a set speed for a set period of time. In an exemplary embodiment, the method comprises determining that the engine is running when the engine RPM exceeds 400 RPM for more than 4 seconds In an embodiment in which the hydraulic system is configured to operate at a system stand-by pressure differential $S\Delta P_{st}$, the hydro-mechanically defined stand-by pressure differential $M\text{-}\Delta P_{st}$ may be lower than system stand-by pressure differential $S\Delta P_{st}$, and the method may comprise increasing the pump supply pressure to at least the system stand-by pressure differential $S\Delta P_{st}$ in dependence on a determination that the engine is running.

In an embodiment the method comprises using the one or more controllers to generate a pump supply control signal for increasing the pump supply pressure above the hydro-mechanically defined stand-by pressure differential $M\text{-}\Delta P_{st}$ by at least a predefined amount (an electronic stand-by pressure differential $E\text{-}\Delta P_{st}$) in dependence on a determination that the engine is running.

The method may comprise controlling the hydraulic supply system so that it provides a minimum pump supply pressure that defines a stand-by pressure differential which is equal to the hydro-mechanically defined stand-by pressure differential $M\text{-}\Delta P_{st}$ plus an additional electronic stand-by pressure differential $E\text{-}\Delta P_{st}$ once the engine is determined to be running.

The method may comprise inhibiting LS functionality for controlling the pump supply pressure PSP in dependence on a load sensing pressure LSP of the at least one consumer during engine start-up in the absence of a determination that the engine is running being made. The method may comprise only commencing LS functionality once the engine has started and is running at a steady state. In an embodiment, the method comprises commencing LS functionality when the engine RPM exceeds a set speed for a set period of time. In an exemplary embodiment, the method comprises commencing LS functionality when the engine RPM exceeds 400 RPM for more than 4 seconds. The method may comprise commencing LS functionality at the same time as the increased stand-by pressure differential is applied and in response to the same condition indicative that the engine is running the engine being met.

In other embodiments, there is provided a mobile machine having an engine and a hydraulic supply system. The hydraulic supply system comprises a pump supply including a pump driven by the engine for supplying a pressurized fluid to at least one consumer on the mobile machine and/or an implement attached to the mobile machine. The pump supply is configured to provide a hydro-mechanically defined stand-by pressure differential $M\text{-}\Delta P_{st}$. The mobile machine comprises a control system for the hydraulic system. The control system comprises one or more controllers configured to receive, from a pressure sensor of a load sensing LS system associated with the at least one consumer, a pressure signal indicative of a sensed load sensing pressure LSP associated with the at least one consumer; and to generate a pump supply control signal for adjusting the pump supply pressure in dependence the load sensing pressure. The control system is configured to make a determination that the engine is running in dependence on at least one condition indicative that the engine is running being met and to inhibit LS functionality for controlling the pump supply pressure PSP in dependence a sensed load sensing pressure LSP associated with the at least one consumer in the absence of a determination that the engine is running.

By inhibiting electronic load sensing functionality while the engine is being started, this eliminates the risk of the load sensing system demanding an increase in the pump supply pressure in response to a sensed load sensing pressure LSP, which may be erroneous.

In an embodiment, the one or more controllers is/are configured to determine that the engine is running and commence LS functionality in dependence the engine RPM exceeding a set speed for a set period of time. In one exemplary embodiment, the one or more controllers is/are configured to determine that the engine is running when the engine RPM exceeds 400 RPM for more than 4 seconds.

The mobile machine may have any of the features of the mobile machine as set out above. The mobile machine may be an agricultural mobile machine and may be a tractor.

In some embodiments, there is provided a method of controlling a hydraulic supply system on a mobile machine having an engine. The hydraulic supply system comprises a pump supply including a pump driven by the engine for supplying a pressurized fluid to at least one consumer on the mobile machine and/or an implement attached to the mobile machine. The pump supply is configured to provide a hydro-mechanically defined stand-by pressure differential $M\text{-}\Delta Pst$ whenever the pump is being driven by the engine. The mobile machine comprises a control system for the hydraulic system. The control system comprises one or more controllers configured to receive, from a pressure sensor of a load sensing LS system associated with the at least one consumer, a pressure signal indicative of a sensed load sensing pressure LSP associated with the at least one consumer; and to generate a pump supply control signal for adjusting the pump supply pressure in dependence the load sensing pressure. The method comprises inhibiting LS functionality for controlling the pump supply pressure PSP during engine start-up.

In an embodiment, the method comprises commencing LS functionality only when at least one condition indicative that the engine has started is met. In an embodiment, the method comprises comprising commencing LS functionality when the engine RPM exceeds a set speed for a set period of time. In an exemplary embodiment, the method comprises commencing LS functionality when the engine RPM exceeds 400 RPM for more than 4 seconds.

The method may have any of the features of the method set out above. The mobile machine may be an agricultural mobile machine and may be a tractor.

Some embodiments include a computer readable storage medium comprising the computer software described above. Optionally, the storage medium comprises a non-transitory computer readable storage medium.

Within the scope of this application it should be understood that the various aspects, embodiments, examples and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

Embodiments will now be described, by way of example only, with reference to the further accompanying drawings, in which:

FIG. 5 is a schematic representation of an embodiment of a hydraulic system embodied in the combination of FIG. 4.

DETAILED DESCRIPTION

Figure 4:
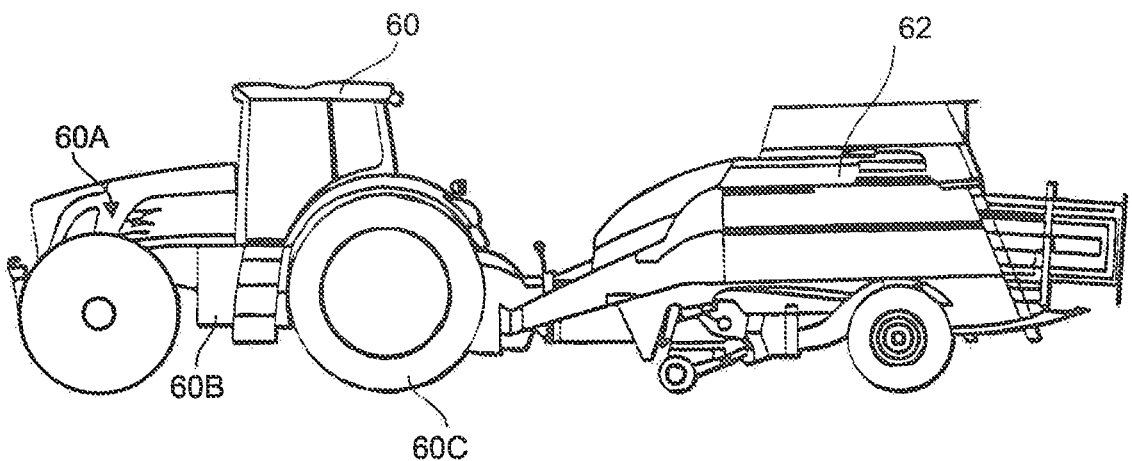
FIG. 4 is a schematic side view of an agricultural machine and implement combination.

FIG. 4 illustrates a combination comprising a mobile agricultural machine 60 and an implement 62 attached to the rear of the machine. The implement 62 can be any suitable implement attachable to an agricultural machine having hydraulic consumers supplied with pressurized hydraulic fluid from a hydraulic supply system on the machine 60. The implement 62 will be referred to as a rear implement 62 and a further implement having hydraulic consumers fed by the supply on the machine, not shown in FIG. 4 but see FIG. 5, may be attached to the front of the tractor and will be referred to as a front implement 63.

The agricultural machine in the embodiment shown in the drawings and described below is specifically an agricultural tractor 60 and the rear implement 62 is a baler. Other types of rear implement commonly used with tractors include, without limitation, a loading wagon, a towed sprayer, and a towed potato harvester. Furthermore, the disclosure is not limited to application on tractors or other mobile agricultural machines but can be adapted for use with other mobile machines having a hydraulic supply system whether connected with an implement or not.

FIG. 5 is a simplified representation of a hydraulic supply system 64 suitable for use on the tractor 60 and implement 62, 63 combination. The hydraulic supply system 64 incorporates an E-LS system and is configured as disclosed herein.

Hydraulic Network

The hydraulic supply system 64 has pump supply 66 including main pump MP which is of variable displacement type and a pump output controller 68 for adjusting the displacement of the pump. In an embodiment, the pump output controller 68 is configured in a manner similar to that illustrated in FIG. 3. However, in other embodiments, alternative pump output controller arrangements can be adopted including any of those currently used with E-LS systems which enable an electronic controller to regulate and adjust the flow and/or pressure output of the pump supply 66.

The pump MP draws fluid from a tank 69 and supplies pressurized hydraulic fluid at a pump supply pressure PSP to consumers on the tractor and the implement via a pump supply line P. The tank 69 provides a reservoir for the hydraulic supply system in which the fluid is held generally at ambient pressure. The tank 69 is illustrated schematically in FIG. 5. In practice in any given hydraulic supply system 64 there may a single tank 69 or multiple tanks 69.

The consumers on the tractor 60 include a hydraulic steering system SS, a central valve manifold CVM, and a rear valve manifold RVM.

The steering system SS may include a hydraulic cylinder and control valve designated tractor consumer TC1 for moving the steered wheels. The control valve is connected to the pump supply line via a pressure port P and to the tank via a tank port T.

The central valve manifold CVM is installed generally in the middle of the tractor and includes a number of functional valves for controlling a corresponding number of hydraulic consumers located usually in or towards the middle and front area of the tractor. In the example illustrated, the central valve manifold CVM includes three functional valves CMV1, CMV2, CMV3 assembled together and connected to the pump supply line via a common pressure port P and to a return line to the tank at a common return port T. Each valve is assigned to a specific consumer and the valves CMV1, CMV2, CMV3 may have different configurations (e.g., ON/OFF, proportional valves, 3/2 valves, 4/2 valves) according to the functional needs of their respective consumer. The valves CMV1, CMV2, CMV3 are solenoid valves and each has a valve controller VC for controlling the solenoid. The number and configuration of the valves in the CVM may be varied to meet the requirements of the tractor manufacturer and/or the end customer. There may, for example, be more or fewer than three functional valves in the CVM.

The CVM has a common load sensing port LS1 and each of the valves CMV1, CMV2, CMV3 have LS ducts connected to the common LS port LS1 by means of shuttle valves so that the highest load sensing pressure LSP generated by the various valves CMV1, CMV2, CMV3 at any given point in time is forwarded to the LS port.

The CVM can be used to supply hydraulic fluid to various consumers such as, without limitation, a front linkage actuator FLC and an axle suspension system indicated as tractor consumer TC2. Valves in the CVM can also be used to supply consumers on a front implement 63 attached to the tractor indicated as FIC1. Each consumer on the front implement 63 being hydraulically connected to a respective valve CMV2 via front valve couplings FVC.

The RVM is installed in the rear of the tractor and is provided to supply consumers which are mainly in the rear area of the tractor and/or on a rear implement 62. The RVM is similar to the CVM in terms of design and variability and contains a number of functional valves indicated as RMV1 to RMV5 assembled together and connected to the pump supply line via a common pressure port P and to a return line to the tank at a common return port T. At least some of the valves in the RVM may be used to supply consumers on a rear implement 62 and/or on the tractor 60. In the exemplary embodiment illustrated, three of the valves, RMV3, RMV4, and RVM5, are connected with respective consumers RIC1, RIC2, RIC3 on the rear implement 62 via rear valve couplings RVC. The RVC may be directly flanged to the RVM as described in European Patent Application Publication 2886926 A1, "Hydraulic Coupling Seal," published Jun. 24, 2015. As it is common to attach complex implements to the rear of a tractor, there may be more than three valves in the RVM for connection to consumers on a rear implement 62. There may, for example, be as many as six, seven, eight or more valves in the RVM assigned for connection to consumers on rear implements. At least some of the valves in the RVM may be assigned to consumers located at or towards the rear of the tractor such as actuators on a rear linkage system. In the exemplary embodiment shown, valve RMV1 is assigned to a pair of lower link hydraulic cylinders LLC being supplied in parallel and valve RMV2 is assigned to a hydraulically driven top link actuator cylinder TLC. In an alternative embodiment, the top link actuator may be a mechanical actuator and the valve RMV2 used for other purposes.

Each valve RMV1 to RMV5 in the RVM is a solenoid actuated valve and is provided with a valve controller VC which moves the solenoid and provides a pilot pressure.

Each valve is configured according to the requirements of its respective consumer (e.g., ON/OFF, proportional valves, 3/2 valves, 4/2 valves).

The RVM has a common load sensing port LS2 and LS ducts of the valves RMV1, RMV2, RMV3, RMV4, RMV5 are all connected to the common LS port LS2 by means of shuttle valves so that the highest load sensing pressure LSP generated by the various valves at any given point in time is forwarded to the common LS port.

As with the CMV, the RVM can be configured to have any required number and configuration of valves depending on the number and requirements of the hydraulic consumers on the tractor and any implements that are expected to be attached to the tractor. It should be understood, therefore, that the configuration of the CVM and RVM shown in FIG. 5 is for illustrative purposes only and can be varied.

The hydraulic supply system 64 includes a power beyond interface 70 to provide an "uncontrolled" supply of pressurized fluid to a rear implement 62 which requires more hydraulic functions than can be controlled using the available valves on the tractor. Such a complex implement 62 may be a baler, for example. The power beyond interface 70 includes quick release couplings 70a, 70b to connect the pump supply line P and a return tank line T on the tractor to a pump pressure supply line PI and a return line TI respectively on the implement 62. The power beyond interface provides a pressurized fluid supply to an implement which is at the pump supply pressure PSP but which is otherwise uncontrolled on the tractor.

In a typical arrangement, the rear implement 62 has an implement valve manifold IVM similar to the CVM and RVM as described above. The IVM has a number of functional control valves IMV1 to IMV3 which are each connected to the implement pump supply pressure line PI through a common pressure port P and to the implement return line TI via a common return port T. The IVM also has a common LS pressure signal port LS3 to which LS ducts of each of the valves IMV1 to IMV3 are connected via a series of shuttle valves or the like arranged so that the highest consumer load sensing pressure LSP from the various valves in the IVM at any given point in time is reported to the common LS port LS3. Each valve IMV1 to IMV3 is connected to a respective consumer (e.g. a hydraulic cylinder or hydraulic motor) which are schematically designated RIC4 to RIC6. Each valve is configured according to the requirements of its respective consumer (e.g., ON/OFF, proportional valves, 3/2 valves, 4/2 valves). The valves are all solenoid-controlled valves and each is provided with an electronic valve controller VC which moves the solenoid and provides a pilot pressure (supplied via pump connection to support the valve slider movement).

The number of valves in the IVM is selected depending on the number of consumers on the implement that are to be supplied via the power beyond interface and can be varied as required. Furthermore, there may be more than one valve manifold on the implement and/or one or more separate valves not incorporated into a manifold can be connected to the power beyond interface via suitable hydraulic lines.

In the embodiment shown, the tractor has a further hydraulic consumer in the form of a hydraulic motor 72 for driving a cooling fan CF. The hydraulic motor 72 is controlled by a cooling fan valve CFV which regulates the cooling fan motor to vary the speed of the fan. The CFV is a solenoid-controlled valve having an electronic valve controller VC which is operably connected with an electronic controller 102 on the tractor. The controller is configured to actuate the CFV in order to adapt the motor speed to the cooling demand.

Figure 3:
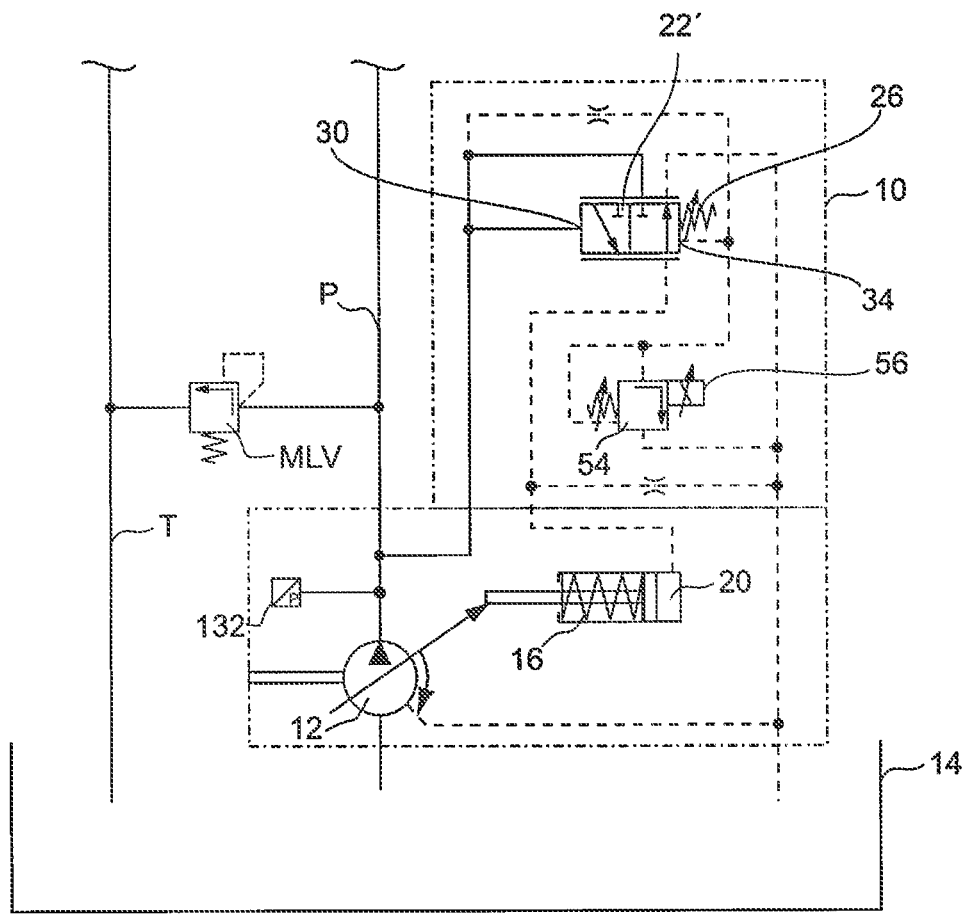
FIG. 3 illustrates how a pump supply including a variable displacement pump can be adapted to incorporate a solenoid-controlled pressure limiting valve for use with an E-LS system.

As illustrated in FIG. 3, the hydraulic supply system may also be provided with a main pressure limiting valve MLV which opens to vent the pump supply P to the tank 69 if the pressure exceeds a predetermined pressure. The MLV is set to open at a pressure above the maximum permitted operating pressure of the system. This provides an additional level of safety in case the limitation of the pump supply pressure PSP through the pump controller should fail. For use with current tractor hydraulic supply systems, the MLV may be set to open a pressure value of around 250 bar for example. However, the pressure at which the MLV opens can be selected as appropriate for any given system.

The hydraulic supply system 64 illustrated in FIG. 5 is exemplary only and can be modified for use with hydraulic supply systems which have alternative layouts, including an alternative number and type of consumers and control valves. For example, the tractor 60 may have more than one pump and may have a fixed displacement pump in addition to the main pump MP for supplying other consumers such as a lubrication system for the driveline, a transmission (of hydrostatic-mechanical split type) or a hydraulic brake system, for example. These are not shown in FIG. 5 as they are not included in the E-LS control arrangements which are the subject of the present disclosure.

Electronic Network

FIG. 5 also illustrates an electronic control system network 100 for the hydraulic supply system 64. As shown, the control network 100 includes a controller 102 on the tractor having an electronic processor 104. The processor 104 is operable to access a memory 106, which may be part of the controller 102, and execute instructions stored therein to perform the steps and functionality disclosed. The memory 106 may include any one or a combination of volatile memory elements (e.g., random-access memory RAM, such as DRAM, and SRAM, etc.) and non-volatile memory elements (e.g., ROM, hard drive, tape, CDROM, etc.). The memory 106 may store a native operating system, one or more native applications, emulation systems, or emulated applications for any of a variety of operating systems and/or emulated hardware platforms, emulated operating systems, etc. The memory 106 may furthermore store parameters or settings needed to operate the control systems and/or perform the methods as described below.

It should be appreciated by one having ordinary skill in the art that in some embodiments, additional or fewer software modules (e.g., combined functionality) may be stored in the memory 106 or in additional memory. In some embodiments, a separate storage device may be coupled to the data bus, such as a persistent memory (e.g., optical, magnetic, and/or semiconductor memory and associated drives). In a further embodiment, the memory 106 may be connectable with an off-board network architecture (via mobile communication or WLAN) to provide parameters or settings.

The processor 104 may be embodied as a custom-made or commercially available processor, a central processing unit (CPU) or an auxiliary processor among several processors, a semiconductor based microprocessor (in the form of a microchip), a macro processor, one or more application specific integrated circuits (ASICs), a plurality of suitably configured digital logic gates, and/or other well-known electrical configurations comprising discrete elements both individually and in various combinations to coordinate the overall operation of the controller 102.

Electronic communications among the various components of the control network 100, as indicated by the dashed lines, may be achieved over a controller area network (CAN) bus or via a communications medium using other standard or proprietary communication protocols (e.g., RS 232, Ethernet, etc.). Communication may be achieved over a wired medium, wireless medium, or a combination of wired and wireless media.

The controller 102 is in communication with each of the electronic solenoid valve controllers VC of the various valves on the tractor, with the pump output controller 68, and with various user interfaces such as a steering wheel SW, valve rockers represented as UI1 and UI2, a linkage control represented as UI3, and a touch screen TS. The touch screen is typically located within a cab of the tractor to provide information to the driver and receive input (e.g. to select, adjust and/or save settings). The touch screen TS may alternatively be replaced or enhanced by a keyboard to receive input. Indeed, any input or presentation of information whether by manual, speech or gestures may be included herein. Each user interface UI may be permanently assigned to one consumer of the tractor or the implement. Alternatively, one or more of the user interfaces may be variably assignable to any one of two or more consumers by the operator. Such an assignment might be effected via the touch screen, for example.

The controller 102 may also receive further data, such as from a GPS receiver to determine the current vehicle position, and/or may be operative to control further devices.

The rear implement 62 may also be connected to the tractor controller 102, such as via a standardized agricultural ISOBUS for example, to exchange data and control between the implement and tractor as described later on. For this purpose, the implement 62 may be provided with an implement controller 110 which communicates with the tractor controller 102. If present, an implement controller 110 may have an electronic processor 114 which is operable to access a memory 112 of the implement controller 110 and execute instructions stored therein to perform the steps and functionality disclosed herein.

The memory 112 may include any one or a combination of volatile memory elements (e.g., random-access memory RAM, such as DRAM, and SRAM, etc.) and non-volatile memory elements (e.g., ROM, hard drive, tape, CDROM, etc.). The memory 112 may store a native operating system, one or more native applications, emulation systems, or emulated applications for any of a variety of operating systems and/or emulated hardware platforms, emulated operating systems, etc. The memory 112 may furthermore store parameters or settings needed to operate the control systems as described below.

It should be appreciated by one having ordinary skill in the art that in some embodiments, additional or fewer software modules (e.g., combined functionality) may be stored in the memory 112 or additional memory. In some embodiments, a separate storage device may be coupled to the data bus, such as a persistent memory (e.g., optical, magnetic, and/or semiconductor memory and associated drives). In a further embodiment, the memory 112 may be connectable with an off-board network architecture (via mobile communication or WLAN) to provide parameters or settings.

The processor 114 may be embodied as a custom-made or commercially available processor, a central processing unit (CPU) or an auxiliary processor among several processors, a semiconductor based microprocessor (in the form of a microchip), a macro processor, one or more application specific integrated circuits (ASICs), a plurality of suitably configured digital logic gates, and/or other well-known electrical configurations comprising discrete elements both individually and in various combinations to coordinate the overall operation of the controller 102.

Load Sensing

Returning to the hydraulic supply system, at any given time, a highest of the load sensing pressure demands LSP from the consumers on the tractor 60 and any attached implements 62 is used to regulate the pump output controller 68 by means of a load sensing LS system. The load sensing system includes an electronic (electrohydraulic) load sensing (E-LS) system including a number of pressure sensors for sensing load sensing pressure demand signals LSP from consumers which are part of the E-LS system. Each of the pressure sensors is in communication with a controller 102 or 110 and forwards to the controller an electronic load sensing pressure signal ELSPS (a pressure signal) representative of the sensed consumer load sensing pressure LSP.

The electronic load sensing pressure signal ELSPS may be an analogue signal in which a characteristic of the signal is modulated in dependence on the pressure of the hydraulic load sensing pressure signal LSP. In an embodiment, the current of the ELSPS is modulated in dependence on the pressure of the hydraulic load sensing pressure signal LSP but in another embodiment it is the voltage. In an embodiment in which the ELSPS is an analogue signal, the controller 102,110 converts the ELSPS into a pressure value by reference to data stored in the controller (or to which the controller has access) which provides a correlation between the modulated characteristic and pressure for the sensed load sensing pressure LSP. This data may be provided in the form of a characteristic map or a look up table assigned to the sensor. In another embodiment, the pressure sensor has a CPU and communicates with the controller through a CAN interface. In this case, conversion of the analogue signal to a pressure value is made at the sensor and the pressure value forwarded to the controller 102, 110.

In the embodiment illustrated, a first pressure sensor 122 is connected with the LS port LS1 on the CVM, where it is subject to the highest consumer load sensing pressure signal LSP of the valves in the CVM. A second pressure sensor 124 is connected with an LS port LS2 on the RVM, where it is subject to the highest consumer load sensing pressure signal LSP of the valves in the RVM. A third pressure sensor 125 is connected with an LS port LS4 on the cooling fan valve CFV to sense the load sensing pressure of the cooling fan motor.

A fourth pressure sensor 126 on the tractor is connected with a LS coupling 70c of the power beyond interface. On the implement, the LS power beyond coupling may be hydraulically connected with the common LS port LS3 of the IVM so that the highest load sensing pressure demand LSP from the various valves in the IVM is forwarded to the fourth pressure sensor 126 when the implement is coupled to the tractor. However, for implements which have a controller 112, an implement pressure sensor 128 can be connected with the common LS port LS3 of the IVM. In this case, the implement pressure sensor 128 communicates with the implement controller 112 and forwards to the implement controller 112 an electronic load sensing pressure signal ELSPS representative of the sensed consumer load sensing pressure LSP at the IVM common LS port LS3. The implement controller 112 forwards data relating to the sensed load demand pressure LSP to the tractor controller 102. The implement controller 110 may process the load sensing pressure demand data and forward to the tractor controller 102 data which is modified or a signal which is a function of the sensed load sensing pressure signal LSP.

The load sensing pressure demand LSP of the steering system is also sensed electronically to form part of the E-LS system. FIG. 5 illustrates two alternative arrangements. In one embodiment, an LS port LS5 of the steering system actuator/control valve TC1 is hydraulically connected by a LS signal line to an LS input port LS6 on the CVM. The LS input port LS6 is connected together with the LS ducts of each of the valves in the CVM to the common LS port LS1 by a suitable cascade of shuttle valves so that the highest load sensing pressure demand LSP from the steering system and the various valves CMV1 To CMV3 is reported to the common LS port LS1 to be sensed by the first pressure sensor 122. In an alternative embodiment, a dedicated pressure sensor 130 is provided to sense the load demand pressure LSP of the steering system. The steering system pressure sensor 130 may be hydraulically connected to the LS port of the steering system and electronically connected to the tractor controller 102 to forward to the controller an electronic load sensing pressure signal ELSPS representative of a sensed consumer load sensing pressure LSP of the steering system.

The tractor controller 102 is configured to select an electronic load sensing pressure signal ELSPS representative of the highest consumer load sensing pressure LSP forwarded to it, either directly from a pressure sensor or from the implement controller 112. The controller processes the selected signal and forwards an electronic pump supply control signal EPSCS to the output controller 68 of the main pump MP to vary the output of the pump MP in dependence on the highest sensed load sensing pressure LSP. If the pump output controller 68 comprises a solenoid controlled pressure limiting valve 54 as illustrated in FIG. 3, the tractor controller 102 forwards an electronic pump supply control signal EPSCS to actuate the solenoid of the pressure limiting valve 54 in order to vary the output of the main pump. Typically, the current of the electronic pump supply control signal EPSCS will determine the extent of movement of the solenoid and so will determine the pressure $P_{set}$ of the resulting hydraulic pump supply control signal HPSCS applied to the LS port 34 of the flow control valve 22' and hence the supply pressure PSP of the main pump. The resulting pump supply pressure PSP can be calculated by equation 1:

$$PSP = \Delta P_{st} + P_{set} \qquad \text{Equation 1}$$

where $\Delta P_{st}$ is the static or stand-by pressure differential defined by the spring 26 in the flow control valve 22', and $P_{set}$ is the pressure of the hydraulic pump supply control signal HPSCS provided at the LS pressure port of the flow control valve.

If the implement has an electronical controller 110, communication between the tractor controller 102 and electronic components of the LS pressure control system on the implement, such as valve controllers VC and pressure sensors 128 of the IVM, is typically made via the implement controller 110, with data and instructions being transmitted between the implement controller 110 and the tractor controller 102 via a standardized ISOBUS connection.

In an embodiment, the controller 102 converts a target pressure value for $P_{set}$ to a current value for forwarding to the solenoid-controlled pressure limiting valve 54 (or other transducer) as an analogue electronic pump supply control signal EPSCS. In another embodiment, the pump output controller 68 has a CPU and communicates with the controller 102 through a CAN interface. In this case, the controller 102 forwards the target set point pressure value $P_{set}$ to pump controller 66 in an electronic pump supply control signal EPSCS through a CAN interface and the pump CPU converts the pressure value to an analogue signal for controlling the pressure limiting valve 54 or other transducer.

Conversion of the target pressure value for $P_{set}$ to a current value may be made by reference to data which provides a correlation between a current value and the resulting pressure $P_{set}$ generated by the solenoid-controlled pressure limiting valve 54 or other transducer. This data may be stored in, or is otherwise accessible to, the controller 102 or pump controller CPU and may be provided in a characteristic map or a look up table assigned to the valve 54 and/or the pump MP for example. In other embodiments it may be a voltage of the analogue which is modulated to control the output of the solenoid-controlled pressure limiting valve 54.

The pressure sensors, the one or more controllers 102, 110, and the pump output controller 68 can all be considered as part of a control system for the hydraulic supply system.
Pressure Differential Set in Dependence on the Rate of Increase of Load Pressure Demand LSP In accordance with an embodiment, the tractor controller 102 is programmed and configured to control adjustment of the output of the main pump MP in dependence not only on the value of the sensed load sensing pressure LSP but also in dependence on the rate of change of an increasing load sensing pressure demand LSP (referred to as the LSP pressure gradient).

In accordance with a suitable algorithm, the tractor controller 102 determines the LSP pressure gradient of a highest of the load sensing pressure signals LSP forwarded to it by the various pressure sensors in the E-LS network. If the LSP pressure gradient is below a threshold value Tr, the controller 102 regulates the main pump output so that the supply pressure PSP is maintained above the load sensing pressure LSP by a first differential. In an embodiment, the first differential is the stand-by or static pressure differential $\Delta P_{st}$ defined by the spring 26 in the flow control valve 22' and the tractor controller 102 forwards an electronic pump supply control signal EPSCS to the pressure limiting valve 54 calibrated to generate a hydraulic pump supply control signal HPSCS having a pressure $P_{set}$ that is the same as (or equivalent to) the load demand pressure LSP. The resulting pump supply pressure PSP under this circumstance can be derived from equation 1 where $P_{set}$=LSP so that equation 1 can be re-written as:

$$PSP = \Delta P_{st} + LSP \qquad \text{Equation 2}$$

Accordingly, when the rate of change of an increasing consumer load sensing pressure LSP is below the threshold value Tr, the E-LS system operates broadly in the same manner as a conventional E-LS system. However, when the rate of increase of a consumer load sensing pressure LSP is at or above the threshold value Tr, the controller 102 is programmed and configured to regulate the main pump output so that the supply pressure PSP is maintained above the load sensing pressure LSP by a second differential larger than the first pressure differential $\Delta P_{st}$. The second pressure differential can be considered to be made up of the static or stand-by pressure differential $\Delta P_{st}$ regulated by the spring 26 in the flow control valve 22' plus an additional dynamic pressure differential $\Delta P_{dyn}$ which is applied by the controller 102 through the hydraulic pump supply control signal HPSCS generated by the pressure limiting valve 54. In this case, the tractor controller 102 forwards to the pressure limiting valve 54 an electronic pump supply control signal EPSCS calibrated to generate a hydraulic pump supply control signal HPSCS having a pressure $P_{set}$ that is higher than the load demand pressure LSP by the amount of the dynamic pressure differential $\Delta P_{dyn}$, such that $P_{set}$ is equal to the load demand pressure LSP plus the dynamic pressure differential $\Delta P_{dyn}$ ($P_{set}$=LSP+$\Delta P_{dyn}$). Equation 1 in this case can be re-written as:

$$PSP = P_{st} + LSP + \Delta P_{dyn} \quad \text{Equation 3}$$

By providing an increased pressure differential when the rate of increase of the load sensing pressure LSP is at or above a certain threshold Tr, the dynamic response of the system is increased. The dynamic pressure differential $\Delta P_{dyn}$ may be applied for a set time period once it is triggered as discussed below.

In a first example, $\Delta P_{st}$ is set at 20 bar, the threshold value Tr of the LSP pressure gradient is set at 5 bar/50 ms (a pressure increase of 5 bar in 50 ms), and the dynamic pressure differential $\Delta P_{dyn}$ is set at 20 bar.

The following tables compare the dynamic performance of a conventional E-LS system and an E-LS system in accordance with the embodiment described above when a consumer valve is opened to produce a consumer load sensing pressure LSP rapidly increasing to 140 bar. Table 1 below illustrates a typical dynamic response of a conventional E-LS control system in these circumstances.

TABLE 1 pressure differential increased by LSP in accordance with prior art $PSP = \Delta P_{st} + P_{set}$ (where $P_{set}$ = LSP)

| Cycle | Description | $\Delta P_{st}$ (bar) | LSP at start of cycle (bar) | PSP at end of cycle (bar) |
|---|---|---|---|---|
| 1 | Pump pressure is 20 bar, valve is actuated. $P_{set}$ = 20 bar (LSP) is forwarded to pump controller, pump supply pressure is adjusted to 40 bar | 20 | 20 | 40 |
| 2 | Pump pressure is 40 bar, valve is actuated. $P_{set}$ = 40 bar (LSP) is forwarded to pump controller, pump supply pressure is adjusted to 60 bar | 20 | 40 | 60 |
| 3 | Pump pressure is 60 bar, valve is actuated. $P_{set}$ = 60 bar (LSP) is forwarded to pump controller, pump supply pressure is adjusted to 80 bar | 20 | 60 | 80 |
| 4 | Pump pressure is 80 bar, valve is actuated. $P_{set}$ = 80 bar (LSP) is forwarded to pump controller, pump supply pressure is adjusted to 100 bar | 20 | 80 | 100 |
| 5 | Pump pressure is 100 bar, valve is actuated. $P_{set}$ = 100 bar (LSP) is forwarded to pump controller, pump supply pressure is adjusted to 120 bar | 20 | 100 | 120 |
| 6 | Pump pressure is 120 bar, valve is actuated. $P_{set}$ = 120 bar (LSP) is forwarded to pump controller, pump supply pressure is adjusted to 140 bar | 20 | 120 | 140 |
| 7 | Pump pressure is 140 bar, valve is actuated. $P_{set}$ = 140 bar (LSP) is forwarded to pump controller, pump supply pressure is adjusted to 160 bar | 20 | 140 | 160 |

As illustrated in Table 1, at each cycle the pressure $P_{set}$ of hydraulic pump supply control signal HPSCS forwarded to the pump controller is equal to the consumer load sensing pressure signal LSP at that time. In the arrangement illustrated, it takes seven cycles for the system to increase the pump supply pressure PSP to 160 bar as required to maintain the pump supply pressure higher than the final consumer load sensing pressure LSP of 140 bar by the static pressure differential $\Delta P_{st}$.

Table 2 below shows the effect of increasing the pressure $P_{set}$ of the hydraulic pump supply control HPSCS to include a dynamic pressure differential $\Delta P_{dyn}$ of 20 bar when the rate of increase of LSP reaches the threshold value Tr of 5 bar/50 ms.

TABLE 2

Pressure differential increased depending on rate of change of LSP $PSP = \Delta P_{st} + P_{set}$ (where $P_{set} = LSP + \Delta P_{dyn}$)

| | | $P_{set}$ | | |
| --- | --- | --- | --- | --- |
| Cycle Description | $\Delta P_{st}$ (bar) | LSP at start of cycle (bar) | $\Delta P_{dyn}$ (bar) | PSP at end of cycle (bar) |
| 1 Pump pressure is 20 bar, valve is actuated. $P_{set} = 20$ bar (LSP + $\Delta P_{dyn}$) forwarded to pump controller, pump supply pressure is adjusted to 40 bar | 20 | 20 | 0 (no LSP gradient initially available) | 40 |
| 2 Pump pressure is 40 bar, valve is actuated. $P_{set} = 60$ bar (LSP + $\Delta P_{dyn}$) is forwarded to pump controller, pump supply pressure is adjusted to 80 bar | 20 | 40 | 20 (LSP gradient > 5 bar/50 ms) | 80 |
| 3 Pump pressure is 80 bar, valve is actuated. $P_{set} = 100$ bar (LSP + $\Delta P_{dyn}$) is forwarded to pump controller, pump supply pressure is adjusted to 120 bar | 20 | 80 | 20 (LSP gradient > 5 bar/50 ms) | 120 |
| 4 Pump pressure is 120 bar, valve is actuated. $P_{set} = 140$ bar (LSP + $\Delta P_{dyn}$) is forwarded to pump controller, pump supply pressure is adjusted to 160 bar | 20 | 120 | 20 (LSP gradient > 5 bar/50 ms) | 160 |

It can be seen from Table 2 that increasing $P_{set}$ to include an additional dynamic pressure differential $\Delta P_{dyn}$ when the rate of increase of the load sensing pressure LSP reaches the threshold Tr, fewer cycles (four in this case) are required to increase the pump supply pressure PSP to 160 bar using the method disclosed. This considerably increases the speed of response of the system in adapting the pump supply pressure PSP to meet a rapidly rising consumer load.

In the above example, once application of a dynamic pressure differential $\Delta P_{dyn}$ has been triggered by the rate of increase of the load sensing pressure reaching the threshold Tr, the dynamic pressure differential $\Delta P_{dyn}$ is applied continuously until the consumer demand is met, that is to say when the pump supply pressure PSP equals the sum of the load sensing pressure LSP, the static pressure differential $\Delta P_{st}$, and the dynamic pressure differential $\Delta P_{dyn}$. However, in an alternative embodiment, the dynamic pressure differential $\Delta P_{dyn}$ is only applied for a limited time period after its application is triggered by the rate of increase of the load sensing pressure LSP reaching the threshold Tr and is then ramped down. The time period over which the dynamic pressure differential $\Delta P_{dyn}$ is applied will be referred to as an application period (AP). Applying a dynamic pressure differential $\Delta P_{dyn}$ for a time limited application period AP has been found to provide a dynamic response to a rapidly increasing load sensing pressure LSP but in a more efficient way than applying a dynamic pressure differential $\Delta P_{dyn}$ continuously. The relatively brief application of a dynamic pressure differential $\Delta P_{dyn}$ gives the pump output supply an initial boost to meet the hydraulic load demand but without over supplying the hydraulic system. The application period AP can be selected to meet system requirements but the applicant has found an application period AP in the range of 50 to 300 ms, or in the range of 80 to 200 ms, or in the range of 90 to 150 ms, or in the region of 100 ms to be effective. The system may be configured to apply a dynamic pressure differential $\Delta P_{dyn}$ for different application periods AP depending on operational requirements, such as for different consumers.

In embodiments in which the dynamic pressure differential $\Delta P_{dyn}$ is applied for a time limited application period AP, the system may also be configured to set a delay period DP following one application of a dynamic pressure differential $\Delta P_{dyn}$ before a subsequent application of a dynamic pressure differential $\Delta P_{dyn}$ is permitted. The application of a delay period DP between applications of dynamic pressure differential $\Delta P_{dyn}$ helps to maintain system stability, reducing the risk that oscillations in a load sensing pressure LSP signal are unduly amplified by the addition of a dynamic pressure differential $\Delta P_{dyn}$. The delay period DP is timed from the point at which a dynamic pressure differential $\Delta P_{dyn}$ is first applied. In other embodiments, the delay period DP is timed from the point at which application of a dynamic pressure differential $\Delta P_{dyn}$ is stopped. Indeed, the delay period DP can be timed from any suitable point in relation to an application of a dynamic pressure differential $\Delta P_{dyn}$. Once the delay period DP has expired, a dynamic pressure differential $\Delta P_{dyn}$ can be applied again for the set application period AP if the operating conditions meet the criteria for application of a dynamic pressure differential $\Delta P_{dyn}$. For example, if at the end of the delay period DP following a one application of a dynamic pressure differential $\Delta P_{dyn}$ the rate of increase of the load sensing pressure LSP is at or above the threshold Tr, the controller 102 will again apply a dynamic pressure differential $\Delta P_{dyn}$ for a further application period AP and a further delay period DP begins. The delay period DP can be selected to meet system requirements but the applicant has found that if the delay period DP is timed from the start of a dynamic pressure differential $\Delta P_{dyn}$ being applied, a delay period DP in the range of 600 to 1400 ms, or in the range of 800 to 1200 ms, or in the region of 1000 ms to be effective. The delay period DP is longer than the application period AP and once a dynamic pressure differential $\Delta P_{dyn}$ has been ramped down, no dynamic pressure differential $\Delta P_{dyn}$ is applied for at least the remainder of the delay period DP. Thus, the delay period DP defines a minimum interval between applications of a dynamic pressure differential $\Delta P_{dyn}$.

In other embodiments, once application of a dynamic pressure differential $\Delta P_{dyn}$ is triggered by the rate of increase of the load sensing pressure LSP reaching the threshold Tr, the dynamic pressure differential $\Delta P_{dyn}$ is applied continuously until the rate of rate of increase of the load sensing pressure LSP falls below a threshold value Tr*. This threshold value Tr* may be the same as the threshold value Tr which triggers the application of a dynamic pressure differential $\Delta P_{dyn}$ or it may be a different value. Again, the system may apply a delay period DP following one application of a dynamic pressure differential $\Delta P_{dyn}$ before another application is permitted.

A delay period DP between applications of dynamic pressure differential $\Delta P_{dyn}$ can be adopted in any of the embodiments disclosed herein.

The performance of the hydraulic supply system will be influenced by the choice of dynamic pressure differential $\Delta P_{dyn}$ and threshold value Tr broadly as follows:

A higher value for the dynamic pressure differential $\Delta P_{dyn}$ will increase the system dynamics as it leads to a faster reaction time to change the pump supply pressure PSP once the rate of increase of the consumer load sensing pressure LSP has reached the threshold value. A lower $\Delta P_{dyn}$ value would tend to lead to a slower response but perhaps a smoother and less abrupt change in pump supply pressure PSP.

Lowering the threshold value Tr will increase system dynamics as it causes the dynamic pressure differential $\Delta P_{dyn}$ to be applied sooner when an increase in load sensing pressure LSP occurs, and a higher threshold will delay application of the dynamic pressure differential $\Delta P_{dyn}$ leading to a less dynamic response of the system.

Increasing the dynamic pressure differential $\Delta P_{dyn}$ and/or lowering the threshold value Tr of the rate of increase of the load sensing pressure LSP can both be used to provide higher system dynamics. However, use of a lower threshold value Tr is dependent on the ability of the system to sense the load sensing pressure to the tolerances required for reliable control with a smaller threshold value Tr. In view of this it is generally preferred to increase the dynamic pressure differential $\Delta P_{dyn}$ in order to increase the dynamic performance of a hydraulic system. However, a lower threshold value Tr can be used to increase system dynamics if the value selected and the system permits reliable operation.

As both the dynamic pressure differential $\Delta P_{dyn}$ and the threshold value Tr of the rate of increase of consumer load sensing pressure LSP influence the dynamic behavior of the pump adjustment based on consumer load sensing pressure LSP, they are collectively referred to as "LS dynamic parameters".

The actual values for the threshold Tr and the dynamic pressure differential $\Delta P_{dyn}$ are selected as appropriate to any given hydraulic system and the person skilled in the art will be able to establish suitable values by, for example, trial and error. However, in trials with a typical hydraulic supply system on a tractor having a pump MP with a maximum delivery rate of about 229.5 l/min at an engine speed of 2700 RPM and a maximum pump supply pressure of about 230 bar, the applicant has found that a dynamic pressure differential $\Delta P_{dyn}$ in the range of 10 bar to 40 bar and a threshold value Tr in the range of 4 to 10 bar/50 ms are generally suitable. Values outside of these ranges though might also be applicable in some hydraulic systems.

Values for the LS dynamic parameters may be stored in the memory 106 of the tractor controller 102 or be otherwise accessible to the electronic processor 104. LS dynamic parameters may be provided as a default setting permanently saved to the memory 106 or the system may be configured so the values of the LS dynamic parameters can be set or modified via a user interface, such as the touch screen. This would enable the parameters to be input or adjusted by a driver or other user. If the LS dynamic parameters can be input or modified, this would enable a driver to set the LS dynamic parameters to provide a suitable dynamic performance for a particular job or task and/or enable different values for the parameters to be used for different implements. For example, use of a particular implement may be improved by a more dynamic response, whereas a different type of implement may be better suited to a less dynamic response. The ability to vary the value of one or more of the LS dynamic parameters enables the driver to adapt the hydraulic supply system accordingly. In a further alternative, instead of entering respective values for the threshold Tr and/or the dynamic pressure differential $\Delta P_{dyn}$, the system may be configured to operate in different LS modes which may be optionally selected by a user. The system could, for example, be configured to be operable in a "dynamic mode" or an "efficiency mode", with the values of the LS dynamic parameters being set to provide a faster response to increases in consumer load sensing pressure LSP in the dynamic mode and to provide a slower response time in efficiency mode to reduce power consumption. The system may be further configured to enable selection of a "balanced mode" with the values of the LS dynamic parameters set in-between the dynamic and efficiency modes. The use of predefined, selectable modes require less skill and experience by the driver while still providing an ability to customize the hydraulic supply system settings.

In a further optional refinement, the method may utilize more than one threshold value Tr for the rate of increase of load sensing pressure LSP and more than one dynamic pressure differential $\Delta P_{dyn}$ so as to enable a stepped ramp up of the dynamic pressure differential $\Delta P_{dyn}$ depending on the rate of increase of the load sensing pressure LSP. Accordingly, in an embodiment the system may configured to apply a first dynamic pressure differential $\Delta p1_{dyn}$, for example 20 bar, when the rate of increase of the load sensing pressure LSP is at or above a first threshold value Tr1 but below a second threshold value Tr2, and to apply a higher, second dynamic pressure differential $\Delta P2_{dyn}$, for example 40 bar, when the rate of increase of the load sensing pressure LSP is at or above the second threshold value Tr2. For example, a first threshold value Tr1 could be set at 5 bar/50 ms and a second threshold value Tr2 set at 10 bar/50 ms. It will be appreciated that the values for Tr1, Tr2, $\Delta P1_{dyn}$, and $\Delta P2_{dyn}$ mentioned above are illustrative only and that the values used can be selected as desired to suit any particular hydraulic supply system and performance requirements. It should also be appreciated that more than two different dynamic pressure differentials can be utilized and implemented at suitable threshold values for the rate of increase of the load sensing pressure.

In a yet still further optional refinement, different settings for the LS dynamic parameters are adopted depending on the value of the load sensing pressure LSP. For example, a first dynamic pressure differential $\Delta P1_{dyn}$ and/or threshold value Tr1 for the LSP pressure gradient is/are applied when the load sensing pressure LSP is below a first threshold pressure TP1 and a second dynamic pressure differential $\Delta P2_{dyn}$ and/or threshold value Tr2 for the LSP pressure gradient is/are applied if the load sensing pressure LSP is equal to or above the first threshold pressure TP1. In an embodiment, the LS dynamic parameters may be selected to provide a less dynamic response at higher load sensing pressures. Thus the LS dynamic parameters can be set to provide a fast reaction initially (e.g. to overcome internal inertia in the pump controller when starting to pivot the pump) but then provide a smoother control of the pump supply pressure as the dynamic behavior of the pump increases. This also provides a tiered dynamic response, and it will be appreciated that more than two ranges of load sensing pressure LSP in which different LS dynamic parameters are adopted can be defined. In one example, different LS dynamic parameters are applied in two ranges:

Range 1: a first dynamic pressure differential $\Delta P1_{dyn}$, such as 10-20 bar, is applied when the rate of increase of the load sensing pressure is at or above a threshold value Tr1 of 7 bar/50 ms and the load sensing pressure LSP is below a first pressure threshold TP1, such as 40-45 bar.

Range 2: a second dynamic pressure differential $\Delta P2_{dyn}$, such as 5-10 bar, is applied when the rate of increase of the load sensing pressure is at or above a second threshold value Tr2 of 5 bar/50 ms and the load sensing pressure LSP at or above the first pressure threshold TP1, such as 40-45 bar.

It will be noted that the threshold value Tr1 of the rate of increase of the load sensing pressure is slightly higher in the first range than the second range. The means that the system will wait for a higher increase per time of the load sensing pressure LSP before applying the first dynamic pressure differential $\Delta P1_{dyn}$. Nevertheless, since the dynamic pressure differential $\Delta P1_{dyn}$ applied in the first range is significantly higher than that applied in the second range, the dynamic response is higher overall in the first range than the second. In tests it has been found that the control system is less prone to oscillation by applying a slightly higher threshold value Tr initially. However, there may be circumstances in which the threshold Tr for the load sensing pressure LSP gradient is the same in all LSP pressure ranges or if a lower threshold Tr is used for a range in which the LSP pressure is lower than in a later range in which the LSP pressure is higher.

Additional ranges could be added with a second, a third or more threshold pressures TP2, TP3, . . . TPn with a different dynamic pressure differentials $\Delta P23_{dyn}$, $\Delta P4_{dyn}$, . . . $\Delta Pn_{dyn}$ and/or threshold value(s) Tr for the LSP pressure gradient being applied in each range.

In one embodiment, no dynamic pressure differential $\Delta P_{dyn}$ is applied once the LSP reaches a threshold pressure TP. Thus, in the above example, in a third range in which the LSP pressure is at or above a threshold value TP2 of 70 bar, no dynamic pressure differential $\Delta P_{dyn}$ is applied regardless of the rate of increase of the load sensing pressure LSP.

The actual values for the dynamic pressure differential(s) $\Delta P1_{dyn}$, $\Delta P2_{dyn}$, the threshold value(s) Tr for the LSP pressure gradient, and threshold pressure(s) TP can be selected to meet system requirements and are not limited to the above examples.

In an embodiment, the controller 102 is configured to require that the conditions for a particular range are met for a set period of time, referred to as a range delay period RDP, before a dynamic pressure differential $\Delta P_{dyn}$ for that range is applied. The range delay period RDP may be in the region of 150 to 450 ms, or in the range of 200 to 400 ms, or in the range of 250 to 350 ms, for example. Thus if the system is operating in range 1 and the load sensing pressure LSP increases to or above the threshold value TP1 indicating a change to range 2, the controller 102 waits for the range delay period RDP to expire before the dynamic pressure differential $\Delta P2_{dyn}$ for range 2 can be applied. During this time delay, no dynamic pressure differential $\Delta P_{dyn}$ is applied to control the output of the pump. If after expiry of the range delay period RDP the conditions for range 2 are still met, the dynamic pressure differential $\Delta P2_{dyn}$ for range 2 is adopted and can be applied if the appropriate threshold Tr2 for the load sensing pressure LSP gradient in that range is met. However, if during the range delay period RDP the load sensing pressure LSP indicates a further change of range, such as back to range 1, a further range delay period RDP is applied from the moment the new range is triggered before the dynamic pressure differential $\Delta P1_{dyn}$ for the new range can be applied.

If the system is configured to apply a dynamic pressure differential $\Delta P_{dyn}$ for a limited application period AP when triggered and to apply a minimum delay period DP between applications of a dynamic pressure differential $\Delta P_{dyn}$, the system can be configured to apply both a minimum delay period DP and a range delay period RDP. In this case, the controller 102 may be configured to apply the delay period DP and the range delay period RDP concurrently should a change of range occur while a delay period DP is still running following an earlier application of dynamic pressure differential $\Delta P_{dyn}$ in the previous range. Typically, the delay period DP will be longer than the range delay period RDP.

To further clarify concurrent running of the delay period DP the range delay period RDP, two examples are considered in which the delay period DP is set to 1000 ms and the range delay period RDP is set to 300 ms. In the examples, a change from range 2 to range 1 takes place after the dynamic pressure differential $\Delta P2_{dyn}$ for range 2 has been applied but before the end of the delay period DP triggered by that application.

In a first example, the change of range takes place 600 ms after the delay period DP began. In this case, the range delay period RDP ends 900 ms after the delay period DP had begun. Accordingly, when the delay period DP expires after 1000 ms, the LS dynamic parameters for range 1 are adopted and the dynamic pressure differential $\Delta P1_{dyn}$ for range 1 can be applied, provided the conditions for range 1 are still met and the rate of increase of the load sensing pressure is at or above the threshold value Tr1 for range 1 at the time. If the dynamic pressure differential $\Delta P1_{dyn}$ is subsequently applied, this will be applied for the application period AP and a further delay period DP is commenced.

In a second example, the change in range takes place 800 ms after the delay period DP has begun. In this case, the delay period DP expires 100 ms before the end of the range delay period RDP. Accordingly, application of the LS dynamic parameters for range 1 is delayed for a further 100 ms after the end of the delay period DP. After the range delay period RDP has expired (1100 ms after the previous application of dynamic pressure differential $\Delta P2_{dyn}$ when the system was operating in range 2) the dynamic pressure differential $\Delta P1_{dyn}$ for range 1 can be applied, provided the conditions for range 1 are still met and the rate of increase of the load sensing pressure is at or above the threshold value Tr1 for range 1 at the time. If the dynamic pressure differential $\Delta P1_{dyn}$ is applied, this will be applied for the application period AP and a further delay period DP is commenced.

Should a change of range occur during the application period AP, the controller continues to apply the dynamic pressure differential $\Delta P_{dyn}$ until the end of the application period AP. The controller will also concurrently apply the delay period DP and the range delay period RDP before any further dynamic pressure differential $\Delta P_{dyn}$ is applied.

Use of the delay periods in this way helps to maintain system stability when changing between ranges and smooths reaction when a range is maintained.

It is expected that varying the LS dynamic parameters in discreet ranges of load sensing pressure LSP will offer smoother control with less risk of oscillation. However, in some systems, the LS dynamic parameters may be varied in proportion (e.g. a linear or other mathematical relationship) to the value of pressure of the load sensing pressure LSP, at least over a certain range of pressures.

Engine Start-Up Improvement

As previously noted, engine start-up is an issue for modern tractors which are equipped with an increasing number of systems which must be powered during start-up, placing considerable strain on the engine.

In some embodiments, the hydraulic system is configured to provide a reduced stand-by pressure differential $\Delta p_{st}$ during engine start-up to reduce the resistance applied by the pump on the engine. However, to maintain responsiveness of the hydraulic system, the E-LS control system is configured to increase the stand-by differential pressure $\Delta P_{st}$ once the engine is running.

In the embodiments described above, the stand-by pressure differential $\Delta P_{st}$ is wholly set hydro-mechanically by the spring 26 in the flow control valve 22' and can be designated as a mechanical stand-by pressure differential M-$\Delta P_{st}$. This mechanical stand-by pressure differential M-$\Delta p_{st}$ is applied at all times when the pump is being driven, including while the engine is being started and so may also be referred to as a permanent stand-by pressure differential.

Usually, the mechanical stand-by pressure differential M-$\Delta P_{st}$ is set at a level to ensure that the hydraulic system remains responsive when there is no load demand LSP. This is needed to provide an internal pump pressure differential which is needed to adjust the displacement of the pump, e.g. to operate the pump control actuator 16 shown in FIG. 3. Hydraulic pumps used on tractors typically require a minimum internal pump pressure of 10 bar and the mechanical stand-by pressure differential M-$\Delta P_{st}$ is often set to around 20 bar to enable pump adjustment, valve adjustment and compensate for system losses but it can be higher or lower than this depending on the requirements of the specific hydraulic supply system.

The stand-by pressure differential a hydraulic supply system is designed to operate at will be referred to as the system stand-by pressure differential S$\Delta P_{st}$. In an embodiment, the hydro-mechanically defined stand-by pressure differential M-$\Delta P_{st}$ is reduced below the system stand-by pressure differential S$\Delta P_{st}$. For example, if a system is configured to operate with a system stand-by pressure differential S$\Delta P_{st}$ of say 20 bar (as used in the previous embodiments), the mechanical stand-by pressure differential M-$\Delta P_{st}$ produced by the spring 26 may be set to 10 bar. This decreases the load on the engine during start-up as the pump will demand less power, provided there is no actual consumer demand fed back through the LS system or if the control system is configured to ignore any LS demand during engine start, but still provides the required internal pump pressure differential.

The mechanical stand-by pressure differential M-$\Delta P_{st}$ will be set at a level which provides basic functioning of the hydraulic system in idle mode the event that the electronic E-LS control system should fail but which is not necessarily optimal for full operation when the engine is running. The mechanical stand-by pressure differential M-$\Delta p_{st}$ could be set to be substantially equal to the minimum internal pressure differential of the pump or the highest minimum internal valve pressure differential of the valves in the hydraulic system. Typically for a hydraulic supply system on a tractor, this will be in the region of 10 bar.

The controller 102 is configured to raise the stand-by pressure differential by setting an additional, hydro-electronically defined stand-by pressure differential E-$\Delta P_{st}$ after the engine has started and is running. The hydro-electronically defined stand-by pressure differential will be designated an electronic stand-by pressure differential E-$\Delta P_{st}$. The electronic stand-by pressure differential E-$\Delta P_{st}$ in combination with the mechanical stand-by pressure differential M-$\Delta P_{st}$, provides a combined stand-by pressure differential sufficient for effective and responsive operation of the hydraulic system and will typically be equivalent to the system stand-by pressure differential S$\Delta P_{st}$. In the above example, in which the mechanical stand-by pressure differential M-$\Delta P_{st}$ set by the spring 26 is reduced from 20 bar to 10 bar, the electronic stand-by pressure differential E-$\Delta P_{st}$ is set to 10 bar to provide a combined system stand-by pressure differential s$\Delta P_{st}$ of 20 bar.

In order to produce the electronic stand-by pressure differential E-$\Delta P_{st}$, the controller 102 sends an electronic pump supply control signal to the pressure limiting valve 54 to generate a hydraulic pump supply control signal HPSCS with a pressure $P_{set}$ at the LS port 34 of the flow control valve 22' which causes the pump supply pressure to be raised by at least the amount of the electronic stand-by pressure differentia E-$\Delta P_{st}$.

Thus, when the engine is running but there is no load sensing pressure LSP being reported, $P_{set}$ will be equal to the electronic stand-by pressure differential E-$\Delta P_{st}$. The resulting pump supply pressure PSP (without LS demand) can be calculated by equation 4 (derived from equation 1):

$$PSP = M-\Delta p_{st} + E-\Delta P_{st} \qquad \text{Equation 4}$$

where M-$\Delta P_{st}$ is the hydro-mechanically defined standby pressure differential defined by the spring 26 in the flow control valve 22', and E-$\Delta P_{st}$ is the electronically defined stand-by pressure differential.

In the above example, $P_{set}$=E-$\Delta P_{st}$ and will be equal 10 bar so that $P_{set}$ plus M-$\Delta p_{st}$ are equal to 20 bar, the system stand-by pressure differential S$\Delta P_{st}$. This is the minimum stand-by pressure differential applied after the engine has been started and is running.

Thereafter, the system monitors the consumer load demand and controls the pump supply output as described above by modifying the hydraulic LS pump supply signal $P_{set}$ in dependence on the load sensing pressure LSP. When a load sensing pressure LSP arises and is forwarded to the controller 102, the controller will increase $P_{set}$ to include the electronic stand-by pressure differential E-$\Delta p_{st}$, the load sensing pressure LSP, and any dynamic pressure differential $\Delta p_{dyn}$ as appropriate depending on the rate of increase of the load sensing pressure LSP as described above. The resulting pump supply pressure PSP can be calculated by equation 5:

$$PSP = M-\Delta p_{st} + E-\Delta P_{st} + LSP + \Delta P_{dyn} \qquad \text{Equation 5}$$

where M-$\Delta P_{st}$ is the hydro-mechanically defined standby pressure differential defined by the spring 26 in the flow control valve 22', E-$\Delta p_{st}$ is the electronically defined pressure differential, LSP is the load sensing pressure forwarded from a consumer, and $\Delta P_{dyn}$ is the dynamic pressure differential applicable depending on the rate of change of the LSP.

In an embodiment, the controller 102 is configured to apply the electronic stand-by pressure differential E-$\Delta P_{st}$ once a condition, or a set of conditions, is/are met which indicate that the engine has started and is running. In an embodiment, the controller 102 is configured to apply the electronic stand-by pressure differential E-$\Delta P_{st}$ once the engine RPM exceeds a set speed for a set period of time, such as 400 R/min for more than 4 seconds for example. The controller may receive or be configured to monitor data relating to engine speed from one or more sensors, e.g., an engine speed sensor, (indicated schematically at 103 in FIG. 5) to determine when the engine has started and is running sufficiently for the electronic stand-by pressure differential E-$\Delta P_{st}$ to be applied.

For comparison with the earlier described embodiment, the following table illustrates the dynamic performance of this embodiment at cold start and when a consumer valve is subsequently opened to produce a consumer load sensing pressure LSP rapidly increasing to 140 bar. The controller is configured to apply a dynamic pressure differential $\Delta P_{dyn}$ of 20 bar when the rate of increase of the LS load sensing pressure LSP is at or above a first threshold value T of 5 bar/50 ms. M-$\Delta P_{st}$ is set to 10 bar and E-$\Delta P_{st}$ is set to 10 bar.

supply pressure is increased to 20 bar by the addition of the electronic defined stand-by pressure differential E-$\Delta P_{st}$. This provides a combined standby pressure differential of 20 bar to ensure the system functions efficiently. The combined stand-by pressure differential is maintained while the engine is running. Thereafter, once a consumer load sensing pressure signal LSP is forward at cycle 1, the system performs dynamically in the same manner as the previous embodiment illustrated in table 2 to enable the pump supply pressure PSP to reach the required 160 bar in four cycles. This has the advantage that the load requirement of the pump placed on the engine when the engine is started is reduced without compromising dynamic performance.

It will be appreciated that the level of the mechanical stand-by pressure differential M-$\Delta P_{st}$ set by the flow control valve 22' spring 26 can be varied from that described above depending on system requirements but would typically be set at a value that is significantly below the system stand-by pressure differential S$\Delta P_{st}$ that the system is designed to operate at in normal circumstances.

Though this embodiment is likely to be applied most commonly to hydraulic supply systems having a CC-LS

TABLE 3

PSP = $\Delta P_{st}$ + $P_{set}$ (where $P_{set}$ = E − $\Delta p_{st}$ + LSP + $\Delta P_{dyn}$)

| Cycle | Description | M − $\Delta P_{st}$ (bar) | E − $\Delta P_{st}$ (bar) | LSP at start of cycle (bar) | $\Delta P_{dyn}$ (bar) | PSP at end of cycle (bar) |
|---|---|---|---|---|---|---|
| | During engine start-up | 10 | 0 | 0 | 0 | 10 |
| | Engine running no consumer demand. $P_{set}$ = 10 bar (E − $\Delta P_{st}$) forwarded to pump controller, pump supply pressure is adjusted to 20 bar | 10 | 10 | 0 | 0 | 20 |
| 1 | Pump supply pressure is 20 bar, consumer valve is actuated. $P_{set}$ = 30 bar (E − $\Delta P_{st}$ + LSP) forwarded to pump controller, pump supply pressure is adjusted to 40 bar | 10 | 10 | 20 | 0 (no LSP gradient initially available) | 40 |
| 2 | Pump supply pressure is 40 bar, valve is actuated. $P_{set}$ = 70 bar (E − $\Delta P_{st}$ + LSP + $\Delta P_{dyn}$) is forwarded to pump controller, pump supply pressure is adjusted to 80 bar | 10 | 10 | 40 | 20 (LSP gradient > 5 bar/100 ms) | 80 |
| 3 | Pump supply pressure is 80 bar, valve is actuated. $P_{set}$ = 110 bar (E − $\Delta P_{st}$ + LSP + $\Delta P_{dyn}$) is forwarded to pump controller, pump supply pressure is adjusted to 120 bar | 10 | 10 | 80 | 20 (LSP gradient > 5 bar/100 ms) | 120 |
| 4 | Pump supply pressure is 120 bar, valve is actuated. $P_{set}$ = 150 bar (E − $\Delta P_{st}$ + LSP + $\Delta P_{dyn}$) is forwarded to pump controller, pump supply pressure is adjusted to 160 bar | 10 | 10 | 120 | 20 (LSP gradient > 5 bar/100 ms) | 160 |

Figure 1:
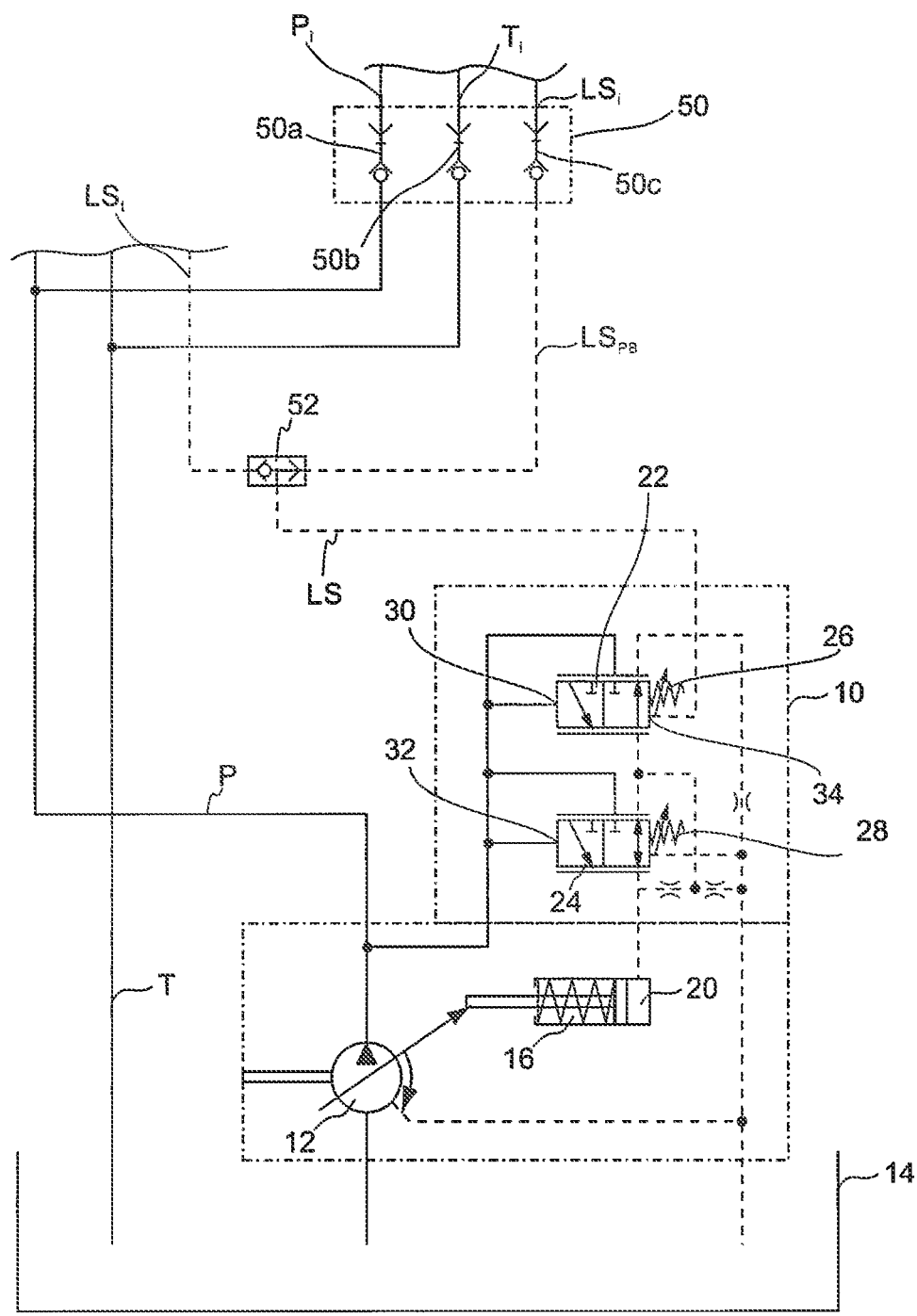
FIG. 1 illustrates part of a simplified known CC-LS hydraulic circuit.
Figure 2:
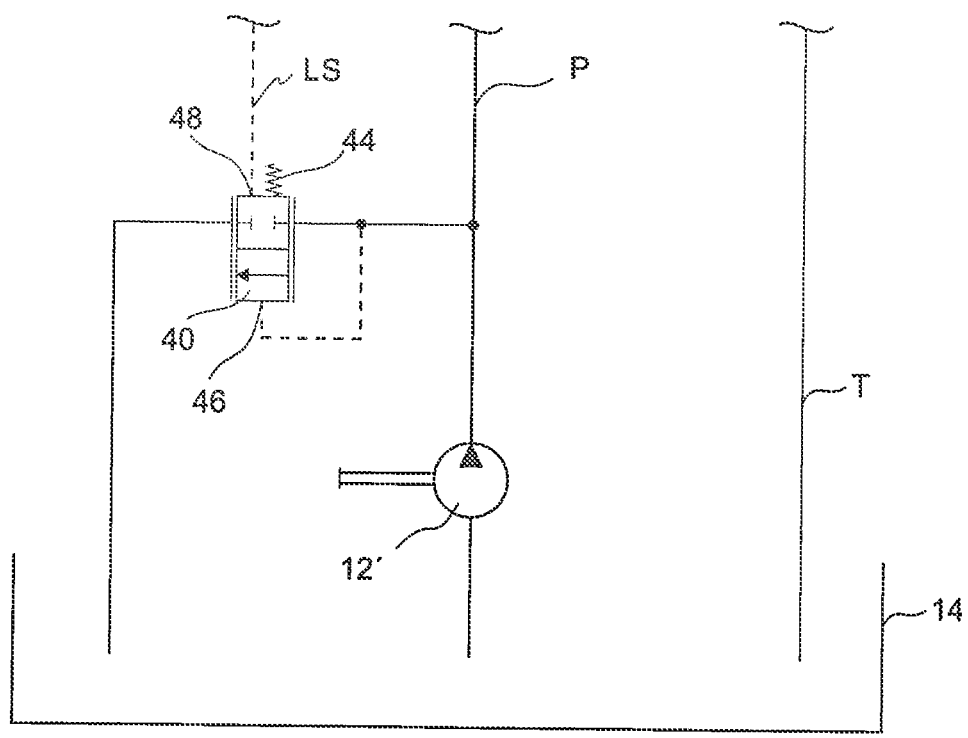
FIG. 2 illustrates part of a simplified OC-LS hydraulic circuit.

As shown in Table 3, during an engine start condition the pump supply pressure is 10 bar (reduced from 20 bar in the previous embodiments) corresponding to the mechanical stand-by pressure differential M-$\Delta P_{st}$. Once the engine is running but prior to any consumer load demand, the pump hydraulic circuit in which the mechanical stand-by pressure differential M-$\Delta P_{st}$ is defined by the spring 26 in a flow control valve 22' of the pump displacement control system as illustrated in FIG. 3, a similar arrangement can be adopted for OC-LS hydraulic systems in which the mechanical stand-by pressure differential M-$\Delta P_{st}$ is defined by a spring 44 of a pressure compensator valve 40 as illustrated in FIG. 2.

As discussed previously, under certain circumstances, an E-LS system can present an unintentional load sensing pressure demand signal at start-up, such as when a tractor has been left standing in the sun and hydraulic fluid in an LS line or LS duct in a valve manifold is heated and its pressure raised. This is incorrectly interpreted by the E-LS system as a consumer load sensing pressure demand LSP and is forward to the pump supply as the engine is being started.

To prevent, or at least reduce the risk of, this situation arising and in accordance with another embodiment, the controller 102 is configured so that E-LS functionality is inhibited during engine start-up. In an embodiment, the controller 102 is configured to commence E-LS functionality taking into account consumer load sensing pressure signals LSP to adjust the pump output only after it has determined that the engine has started and is running. In an embodiment, the controller 102 is configured to commence E-LS functionality once a condition, or a set of conditions, is/are met which indicate that the engine has started and is running. In an embodiment the controller 102 is configured to commence E-LS functionality only when the engine RPM exceeds a set speed for a set period of time, such as 400 R/min for more than 4 seconds for example. In a convenient arrangement, the controller 102 is configured to commence E-LS functionality and to apply the electronically defined stand-by pressure differential E-$\Delta P_{st}$ at the same time and in dependence on the same condition or conditions being met.

Embodiments in which an E-LS system is configured to apply an electronically defined stand-by pressure differential E-$\Delta P_{st}$ once the engine has started so that the pump supply can be configured to apply a lower mechanical stand-by pressure differential M-$\Delta P_{st}$ and/or when the controller 102 is configured to inhibit E-LS load sensing during engine start-up can be adopted in hydraulic supply systems having an otherwise conventional E-LS system which does not adjust the pump supply pressure PSP in dependence on the determined rate of change of the load sensing pressure LSP. In this case, $P_{set}$ will typically be equal to the electronic stand-by pressure differential E-$\Delta P_{st}$ plus the load sensing pressure LSP when there is a load pressure demand.

Various modifications to the mobile machine and methods will be apparent to those skilled in the art, without departing from the scope of the disclosure.

The invention claimed is:

1. A mobile machine having an engine and a hydraulic supply system, wherein the hydraulic supply system comprises a pump supply including a pump driven by the engine for supplying a pressurized fluid to at least one consumer carried by the mobile machine, the pump supply being configured to provide a hydro-mechanically defined stand-by pressure differential (M-$\Delta P_{st}$) whenever the pump is being driven by the engine, the mobile machine comprising a control system for the hydraulic supply system, the control system comprising at least one controller configured to:
   receive, from a pressure sensor of a load sensing (LS) system associated with the at least one consumer, a pressure signal indicative of a sensed load sensing pressure (LSP) associated with the at least one consumer; and
   generate a pump supply control signal for adjusting a pump supply pressure (PSP) in dependence on the LSP;
   wherein, the control system is configured to make a determination that the engine is running in dependence on at least one condition indicative that the engine RPM exceeds a set speed and to adjust the pump supply to increase the PSP to provide a combined stand-by pressure differential, by setting a hydro-electronically defined stand-by pressure differential (E-$\Delta P_{st}$) in addition to the hydro-mechanically defined stand-by pressure differential (M-$\Delta P_{st}$) in dependence on the determination that the engine is running being made.

2. The mobile machine of claim 1, wherein the at least one controller is configured to determine that the engine is running in dependence on an engine RPM exceeding a set speed for a set period of time.

3. The mobile machine of claim 1, wherein the pump supply includes a variable displacement pump having a pump controller including a flow control valve for regulating movement of an actuator to adjust the pump displacement, further comprising a spring operative on a valve spool of the flow control valve to set the hydro-mechanically defined stand-by pressure differential (M-$\Delta P_{st}$).

4. The mobile machine of claim 1, wherein the pump supply includes a fixed displacement pump, the pump supply comprising a pressure compensator valve for selectively connecting a pump supply line to a reservoir to vary the PSP, further comprising a spring operative on a valve spool of the pressure compensator valve to set the hydro-mechanically defined stand-by pressure differential (M-$\Delta P_{st}$).

5. The mobile machine of claim 3, wherein the hydraulic supply system is configured to operate at a system stand-by pressure differential (S$\Delta P_{st}$) and wherein the hydro-mechanically defined stand-by pressure differential (M-$\Delta P_{st}$) is lower than the system stand-by pressure differential (S$\Delta P_{st}$).

6. The mobile machine of claim 5, wherein the control system is configured to raise the stand-by pressure differential to at least the system stand-by pressure differential (S$\Delta P_{st}$) in dependence on a determination that the engine is running.

7. The mobile machine of claim 1, wherein the at least one controller is configured to generate a pump supply control signal for increasing the PSP above the hydro-mechanically defined stand-by pressure differential (M-$\Delta P_{st}$) by at least a predefined amount as defined by the electronic stand-by pressure differential (E-$\Delta P_{st}$), in dependence on the determination that the engine is running being made.

8. The mobile machine of claim 1, wherein the at least one controller is configured to inhibit LS functionality for controlling the output of the pump supply in dependence on the LSP of the at least one consumer unless a determination that the engine is running has been made.

9. The mobile machine of claim 8, wherein the at least one controller is configured to commence LS functionality in dependence on a determination that the engine is running.

10. The mobile machine of claim 8, wherein the at least one controller is configured to determine that the engine is running and commence LS functionality in dependence on at least one condition indicative that the engine is running the engine being met.

11. The mobile machine of claim 10, wherein the at least one controller is configured to determine that the engine is running and commence LS functionality in dependence on an engine RPM exceeding a set speed for a set period of time.

12. A method of controlling a hydraulic supply system on a mobile machine having an engine, wherein the hydraulic supply system comprises a pump supply including a pump driven by the engine for supplying a pressurized fluid to at least one consumer carried by the mobile machine, the pump supply being configured to provide a hydro-mechanically defined stand-by pressure differential (M-$\Delta P_{st}$) whenever the pump is being driven by the engine, the mobile machine comprising a control system for the hydraulic supply system, the control system comprising at least one controller configured to:

receive, from a pressure sensor of a load sensing (LS) system associated with the at least one consumer, a pressure signal indicative of a sensed load sensing pressure (LSP) associated with the at least one consumer; and generate a pump supply control signal for adjusting a pump supply pressure (PSP) in dependence the LSP;

wherein, the method comprises using the at least one controller to determine that the engine is running in dependence on at least one condition indicative that the engine RPM exceeds a set speed and to adjust the pump supply to increase the PSP to provide a combined stand-by pressure differential, by setting a hydro-electronically defined stand-by pressure differential (E-$\Delta P_{st}$) in addition to the hydro-mechanically defined stand-by pressure differential (M-$\Delta P_{st}$) in dependence on a determination that the engine is running being made.

13. The method of claim 12, further comprising determining that the engine is running when an engine RPM exceeds a set speed for a set period of time.

14. The method of claim 12, wherein the hydraulic supply system is configured to operate at a system stand-by pressure differential (S$\Delta P_{st}$) and wherein the hydro-mechanically defined stand-by pressure differential (M-$\Delta P_{st}$) is lower than a system stand-by pressure differential (S$\Delta P_{st}$), the method comprising increasing the PSP to at least the system stand-by pressure differential (S$\Delta P_{st}$) in dependence on a determination that the engine is running.

15. The method of claim 12, further comprising inhibiting LS functionality for controlling the PSP in dependence on a LSP of the at least one consumer in the absence of a determination that the engine is running being made.

16. A mobile machine having an engine and a hydraulic supply system, wherein the hydraulic supply system comprises a pump supply including a pump driven by the engine for supplying a pressurized fluid to at least one consumer carried by the mobile machine, the pump supply being configured to provide a hydro-mechanically defined stand-by pressure differential (M-$\Delta P_{st}$) whenever the pump is being driven by the engine, the mobile machine comprising a control system for the hydraulic supply system, the control system comprising at least one controller configured to:

receive, from a pressure sensor of a load sensing (LS) system associated with the at least one consumer, a pressure signal indicative of a sensed load sensing pressure (LSP) associated with the at least one consumer; and generate a pump supply control signal for adjusting a pump supply pressure (PSP) in dependence on the LSP;

wherein, the control system is configured to make a determination that the engine is running in dependence on at least one condition indicative that the engine RPM exceeds a set speed and inhibit LS functionality for controlling the PSP in dependence on a sensed LSP associated with the at least one consumer in the absence of a determination that the engine is running being made.

17. A method of controlling a hydraulic supply system on a mobile machine having an engine, wherein the hydraulic supply system comprises a pump supply including a pump driven by the engine for supplying a pressurized fluid to at least one consumer carried by the mobile machine, the pump supply being configured to provide a hydro-mechanically defined stand-by pressure differential (M-$\Delta P_{st}$) whenever the pump is being driven by the engine, the mobile machine comprising a control system for the hydraulic supply system, the control system comprising at least one controller configured to:

receive, from a pressure sensor of a load sensing (LS) system associated with the at least one consumer, a pressure signal indicative of a sensed load sensing pressure (LSP) associated with the at least one consumer; and generate a pump supply control signal for adjusting a pump supply pressure (PSP) in dependence the LSP;

wherein, the method comprises inhibiting LS functionality for controlling the PSP while the engine is being started, and commencing LS functionality when an engine RPM exceeds a set speed.

18. The method of claim 17, the method comprising commencing LS functionality when an engine RPM exceeds a set speed for a set period of time.

* * * * *